US009351049B2

(12) United States Patent
Naito et al.

(10) Patent No.: US 9,351,049 B2
(45) Date of Patent: May 24, 2016

(54) DISPLAY DEVICE, TELEVISION, SEARCH METHOD AND RECORDING MEDIUM FOR SEARCHING BASED ON KEYWORD AND SEARCH SYSTEM

(71) Applicant: SHARP KABUSHIKI KAISHA, Osaka-shi, Osaka (JP)

(72) Inventors: Kazuma Naito, Osaka (JP); Takeshi Yarita, Osaka (JP); Yoshiyasu Ogasawara, Osaka (JP)

(73) Assignee: SHARP KABUSHIKI KAISHA, Osaka-shi (JP)

( * ) Notice: Subject to any disclaimer, the term of this patent is extended or adjusted under 35 U.S.C. 154(b) by 0 days.

(21) Appl. No.: 14/394,050

(22) PCT Filed: Mar. 11, 2013

(86) PCT No.: PCT/JP2013/056675
§ 371 (c)(1),
(2) Date: Oct. 10, 2014

(87) PCT Pub. No.: WO2013/157326
PCT Pub. Date: Oct. 24, 2013

(65) Prior Publication Data

US 2015/0082356 A1 Mar. 19, 2015

(30) Foreign Application Priority Data

Apr. 17, 2012 (JP) ................................ 2012-094252

(51) Int. Cl.
*H04N 5/445* (2011.01)
*H04N 21/482* (2011.01)
(Continued)

(52) U.S. Cl.
CPC ........... *H04N 21/4828* (2013.01); *G06F 17/30* (2013.01); *G06F 17/30864* (2013.01);
(Continued)

(58) Field of Classification Search
CPC .......... H04N 21/4828; H04N 21/4622; H04N 21/4312; H04N 21/8405; H04N 5/44543; H04N 21/8173; H04N 21/6175; H04N 21/4782; H04N 21/4821; H04N 21/4532; G06F 17/30864; G06F 17/30
USPC ................................................ 725/53, 40, 44
See application file for complete search history.

(56) References Cited

U.S. PATENT DOCUMENTS 8,108,393 B2 * 1/2012 Yang et al. .................... 707/737
8,200,688 B2 * 6/2012 Messer et al. ................. 707/767
(Continued)

FOREIGN PATENT DOCUMENTS

JP 10-228477 A 8/1998
JP 2004-86754 A 3/2004
(Continued)

*Primary Examiner* — Hoang-Vu A Nguyen-Ba
(74) *Attorney, Agent, or Firm* — Birch, Stewart, Kolasch & Birch, LLP

(57) ABSTRACT

The present invention provides a television including first to fourth keyword candidate acquiring sections for acquiring a plurality of keyword candidates according to algorisms different from each other; a keyword determining section for causing a display section to display thereon a keyword list including the plurality of keyword candidates thus obtained by the keyword candidate acquiring means, and for determining that a search keyword is to be a keyword candidate selected from the keyword list by an input instruction; and a search scope determining section for causing the display section to display a search scope list of a plurality of search scopes different from each other, and for determining that a search scope to be used for search process with the search keyword is to be a search scope selected from the search scope list by an input instruction.

10 Claims, 20 Drawing Sheets

(51) Int. Cl.

| | |
|---|---|
| ***G06F 17/30*** | (2006.01) |
| ***H04N 21/431*** | (2011.01) |
| ***H04N 21/45*** | (2011.01) |
| ***H04N 21/4782*** | (2011.01) |
| ***H04N 21/61*** | (2011.01) |
| ***H04N 21/81*** | (2011.01) |
| ***H04N 21/8405*** | (2011.01) |
| ***H04N 21/462*** | (2011.01) |
| *G06F 3/00* | (2006.01) |
| *G06F 13/00* | (2006.01) |

(52) U.S. Cl.

CPC ....... *H04N5/44543* (2013.01); *H04N 21/4312* (2013.01); *H04N 21/4532* (2013.01); *H04N 21/4622* (2013.01); *H04N 21/4782* (2013.01); *H04N 21/4821* (2013.01); *H04N 21/6175* (2013.01); *H04N 21/8173* (2013.01); *H04N 21/8405* (2013.01); *H04N 2005/44578* (2013.01)

(56) References Cited

U.S. PATENT DOCUMENTS

| | | | | |
|---|---|---|---|---|
| 8,589,982 | B2 * | 11/2013 | Hill et al. | 725/53 |
| 8,914,364 | B2 * | 12/2014 | Sasaki et al. | 707/736 |
| 2003/0172382 | A1 * | 9/2003 | Kim | 725/53 |
| 2004/0260687 | A1 * | 12/2004 | Mano | 707/3 |
| 2007/0255703 | A1 | 11/2007 | Maruyama et al. | |
| 2010/0145982 | A1 * | 6/2010 | Iwase et al. | 707/769 |
| 2014/0215527 | A1 * | 7/2014 | Henty | 725/53 |

FOREIGN PATENT DOCUMENTS

| | | | | |
|---|---|---|---|---|
| JP | 2004-157617 | A | 6/2004 | |
| JP | 2004-326216 | A | 11/2004 | |
| JP | 2007-300497 | A | 11/2007 | |
| JP | 2009-224819 | A | 10/2009 | |
| JP | 2010-134664 | A | 6/2010 | |
| WO | WO-2011-016335 | * | 2/2011 | G06F 17/30873 |

* cited by examiner

F I G. 1
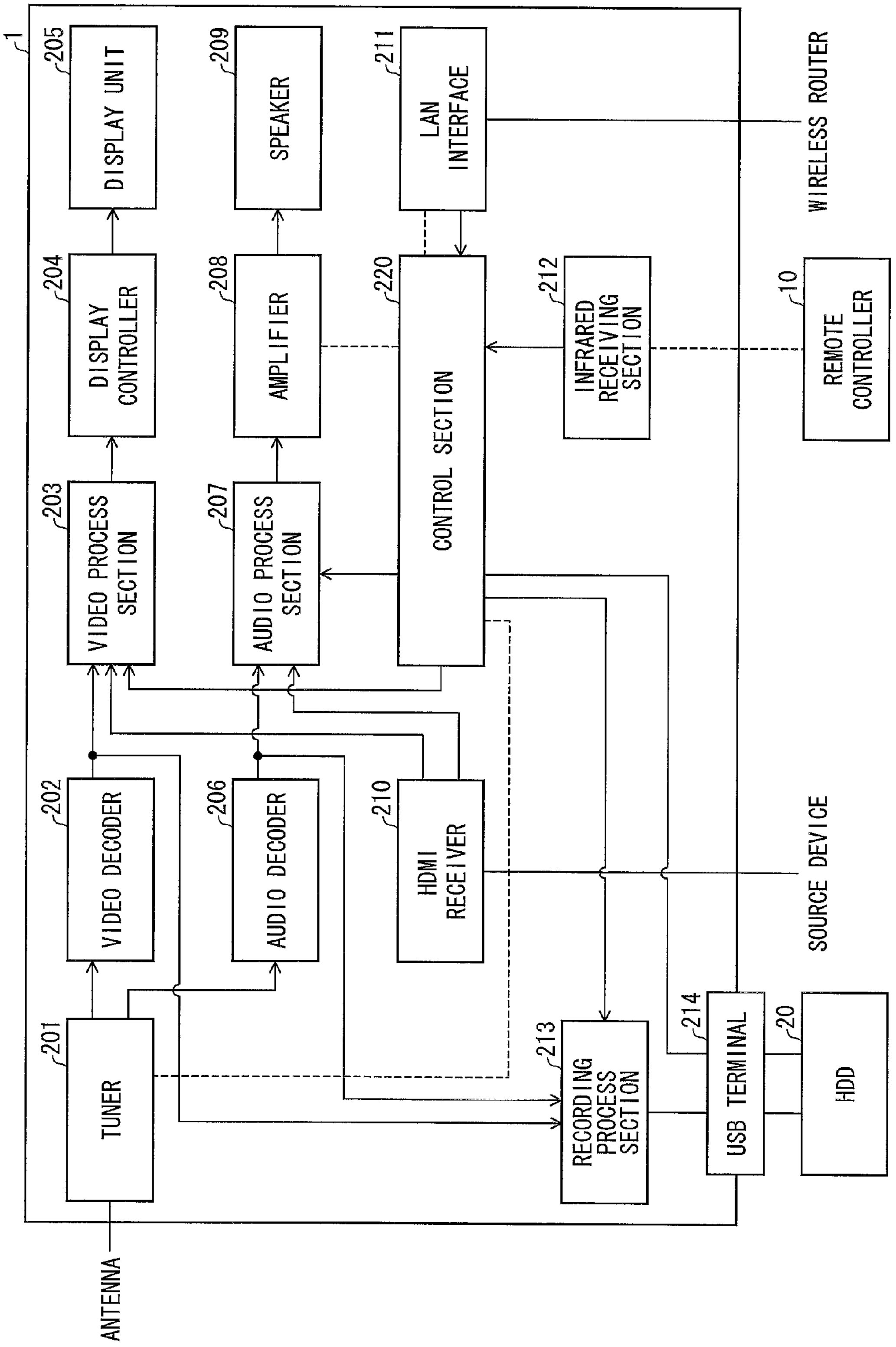

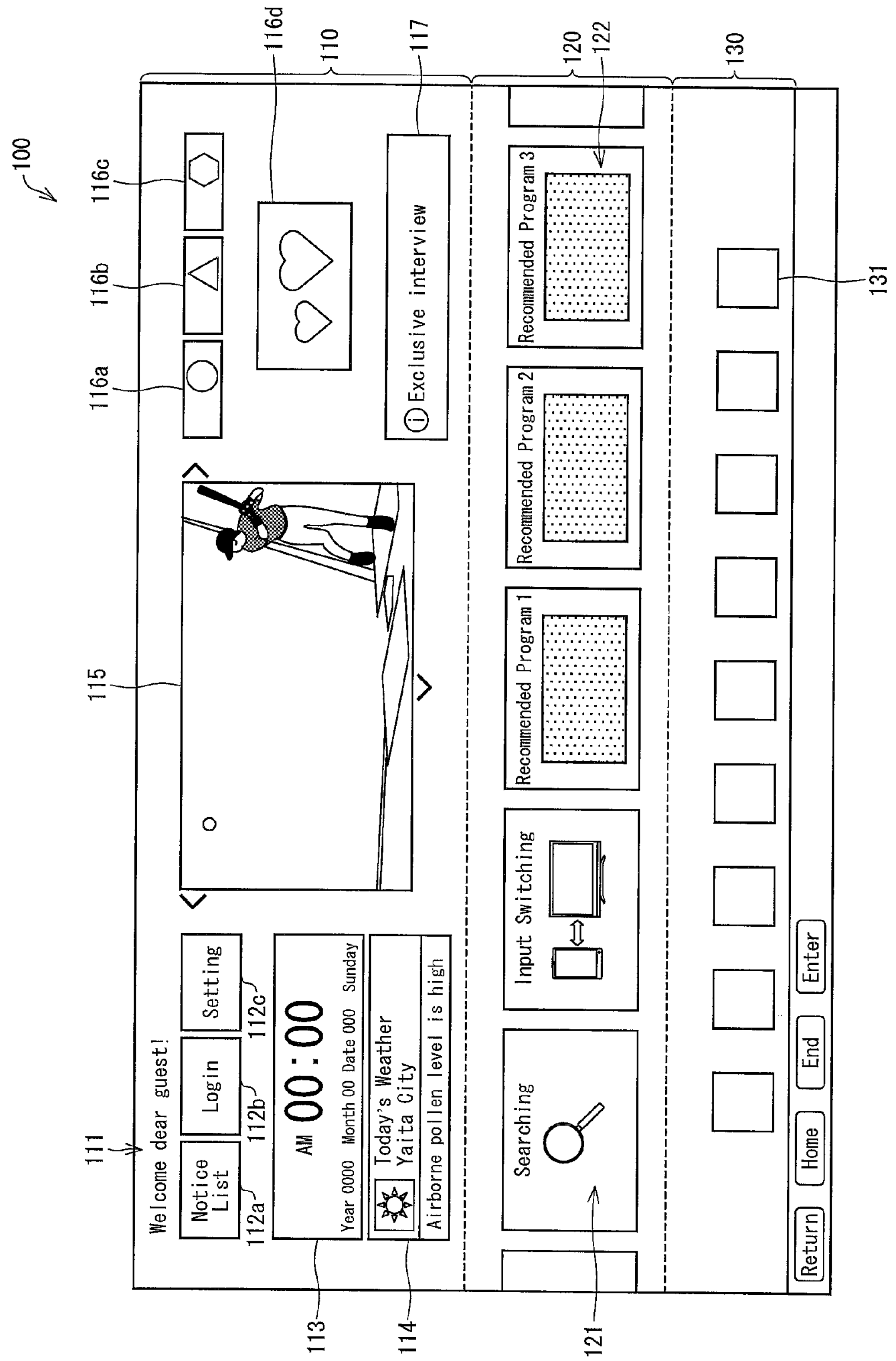
F I G. 2

F I G. 6
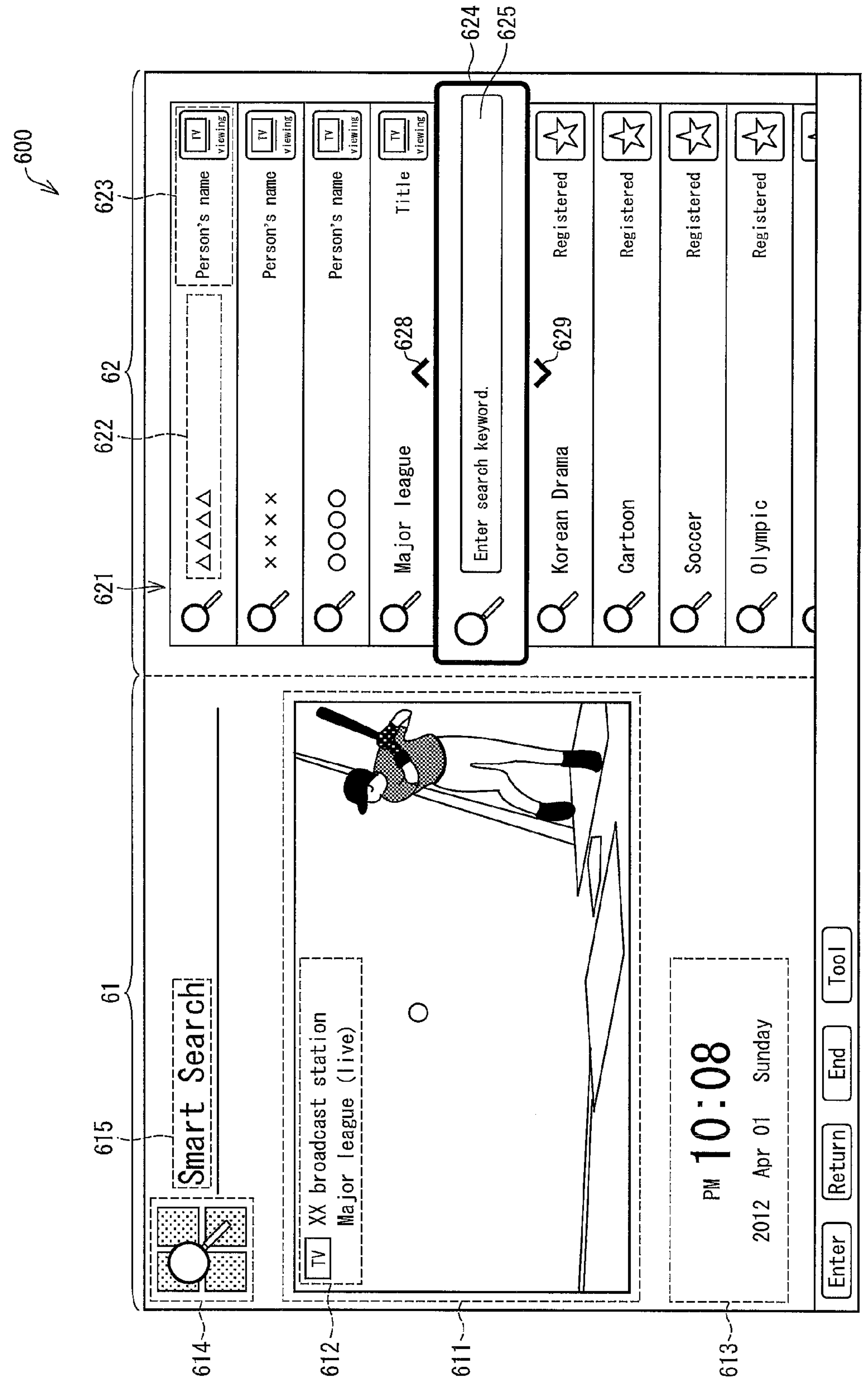

(a)

| | | Number | 例 |
|---|---|---|---|
| (1) (2) (3) | Viewing Person's name (Second Keyword Candidate) | Max 3 | Search with person's name "OOOO" |
| (4) | Viewing Title (First Keyword Candidate) | Max 1 | Search with title "××××" |
| (5) | Input Field | — | |
| (6) (7) (8) (9) (10) | Registered Keyword (Third Keyword Candidate) | Max 5 | Search with Korean Drama |
| (11) (12) (13) (14) (15) | Previously-Searched Keyword (Fourth Keyword Candidate) | Max 5 | Search with Combat Sports |

| | Internet Search | VOD Search | Recorded Program Content List Search | Program Guide Search |
|---|---|---|---|---|
| Net Search : Yes<br>USB-HDD Connected : Yes | available | available | available | available |
| Net Search : No<br>USB-HDD Connected : Yes | not available | not available | available | available |
| Net Search : Yes<br>USB-HDD Connected : No | available | available | not available | available |
| Net Search : No<br>USB-HDD Connected : No | not available | not available | not available | available |

DISPLAY DEVICE, TELEVISION, SEARCH METHOD AND RECORDING MEDIUM FOR SEARCHING BASED ON KEYWORD AND SEARCH SYSTEM

BACKGROUND OF THE INVENTION

1. Technical Field

The present invention relates to a display device, a television, a search method, a program, and a recording medium, each of which makes it possible to perform search process of various types of information.

2. Background Art

In recent years, techniques for searching desired information from among many pieces of information have been developed along development of information and communication technology. For example, Patent Literature 1 discloses a technique for automatically activating a browser in response to input of a keyword, and displaying a result of searching performed by a plurality of registered search engines.

CITATION LIST

Patent Literature

Patent Literature 1

Japanese Patent Application Publication, Tokukaihei, No. 10-228477 (published on Aug. 25, 1998)

SUMMARY OF INVENTION

Technical Problem

However, the technique described in Patent Literature 1 requires that a user should perform the input of the keyword, whereby the trouble of inputting the keyword for the search is inevitably required. Furthermore, because search results from a plurality of search engines are displayed, the number of the search results would be huge, thereby making it time-consuming to find out desired information from the search results.

The present invention was made in view of solving the aforementioned problem, and an object of the present invention is to provide a display device, a television, a search method, a program, and a recording medium, each of which makes it easier for a user to determine a keyword for search process, and to find out desired information from a search result.

Solution to Problem

In order to attain the object, a display device according to one aspect of the present invention is configured to include: a display section; keyword candidate acquiring means for acquiring a plurality of keyword candidates according to algorithms different from each other; keyword determining means for causing the display section to display thereon a keyword list including the plurality of keyword candidates thus obtained by the keyword candidate acquiring means, and for determining that a search keyword is to be a keyword candidate selected from the keyword list by an input instruction; search scope determining means for causing the display section to display a search scope list of a plurality of search scopes different from each other, and for determining that a search scope to be used for search process with the search keyword thus determined by the keyword determining means is to be a search scope selected from the search scope list by an input instruction; and search result displaying means for causing search process to be performed with the search keyword in the search scope determined by the search scope determining means, and for causing the display section to display a search result of the search process.

Moreover, a search method according to one aspect of the present invention is a search method for performing search process by means of a display device, the search method including: a keyword candidate acquiring step of acquiring a plurality of keyword candidates according to algorithms different from each other; a keyword determining step of causing the display device to display thereon a keyword list including the plurality of keyword candidates thus obtained by the keyword candidate acquiring step, and of determining that a search keyword is to be a keyword candidate selected from the keyword list by an input instruction; a search scope determining step of causing the display device to display a search scope list of a plurality of search scopes different from each other, and of determining that a search scope to be used for search process with the search keyword thus determined by the keyword determining step is to be a search scope selected from the search scope list by an input instruction; and a search result displaying step of causing search process to be performed with the search keyword in the search scope determined by the search scope determining step, and of causing the display device to display a search result of the search process.

Advantageous Effects of Invention

The present invention makes it possible to realize a display device, which makes it easier for a user to determine a keyword for search process, and to find out desired information from a search result.

BRIEF DESCRIPTION OF DRAWINGS

FIG. 1 is a block diagram illustrating a hardware configuration and peripheral devices of a television according to one embodiment of the present invention.

FIG. 2 is a view illustrating one example of a menu screen displayed on a display unit of the television illustrated in FIG. 1.

FIG. 6 is a view illustrating one example of a smart search screen displayed at the start of search process.

FIG. 12 is a view illustrating a table for determining whether an icon for search scope selection is selectable or not.

DESCRIPTION OF EMBODIMENTS

<Configuration of Television>

Figure 3:
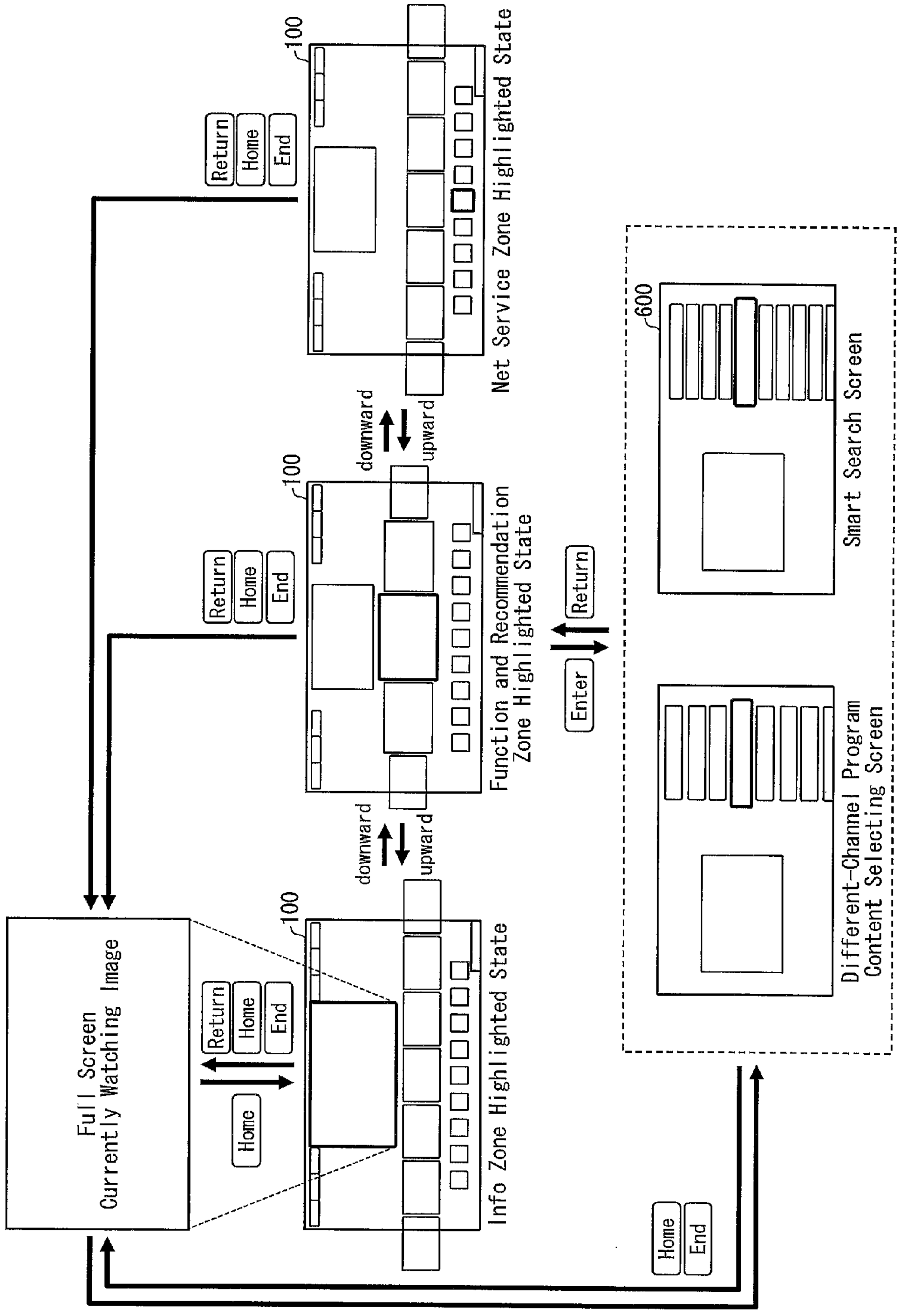
FIG. 3 is a display screen-transition view illustrating display screen transition on the television illustrated in FIG. 1.

A hardware configuration of a television (hereinafter, abbreviated as a TV) 1 according to one embodiment is explained below referring to FIG. 1, which is a block diagram illustrating the hardware configuration and peripheral devices of the TV 1.

The TV 1 is used together with a remote controller (hereinafter, abbreviated as an RC) 10. The RC 10 is configured to perform infrared wireless communication with the TV 1 in order to transmit various signals to the TV 1 according to user's operation of the RC 10. The RC 10 has a home key for displaying a menu screen on the TV 1, and keys for display screen handling, such as an upward key, a downward key, a rightward key, a leftward key, an enter key, a return key, and an end key. The RC 10 is configured to transmit to the TV 1 a signal indicating which key is pressed on the RC 10.

Moreover, the TV 1 includes a USB (Universal Serial Bus) terminal 214, to which an HDD (Hard Disk Drive) 20 can be connected. The HDD 20 is for storing, as a recorded program content, a broadcast program content received by the TV 1. That is, the HDD 20 is for storage of video data, audio data, and program content information of the recorded program content.

As illustrated in FIG. 1, the TV 1 includes a tuner 201, a video decoder 202, a video process section 203, a display controller 204, a display unit 205, an audio decoder 206, an audio process section 207, an amplifier 208, a speaker 209, an HDMI receiver 210, an LAN interface 211, an infrared receiving section 212, a recording process section 213, and a control section 220.

The display unit 205 may be, for example, a liquid crystal display unit, a plasma display unit, an organic EL display unit, or the like.

The tuner 201 is configured to demodulate an encoded video signal and an encoded audio signal from broadcast waves of a broadcast program content of digital terrestrial broadcasting, BS broadcasting, or CS broadcasting. The video decoder 202 is configured to decode the encoded video signal demodulated by the tuner 201. The video signal decoded by the video decoder 202 is supplied to the display controller 204 via the video process section 203. The display controller 204 controls the display unit 205 to display a video image according to the video signal that has been processed by the video process section 203. The audio decoder 206 is configured to decode the encoded audio signal demodulated by the tuner 201. The audio signal decoded by the audio decoder 206 is supplied to the amplifier 208 via the audio process section 207. The amplifier 208 drives the speaker 209 to output sounds according to the audio signal that has been processed by the audio process section 207.

The HDMI receiver 210 is configured to receive a video signal and an audio signal supplied from a source device. The video signal and the audio signal received by the HDMI receiver 210 are supplied to the video process section 203 and the audio process section 207, and outputted via the display unit 205 and the speaker 209, respectively, like the video signal and the audio signal demodulated by the tuner 201.

Moreover, the LAN interface 211 is configured to obtain either a WEB content from a WEB server or a VOD (Video On Demand) content from a VOD server. These network contents are decoded by the control section 220 by means of software. A video signal and an audio signal representing the network content thus decoded by the control section 220 are supplied to the video process section 203 and the audio process section 207, respectively, and then outputted from the display unit 205 and the speaker 209, respectively, like the image signal and audio signal decoded by the tuner 201.

The infrared receiving section 212 receives a signal (RC signal) from the RC 10, and sends the RC signal to the control section 220.

In accordance with instructions from the control section 220, the recording process section 213 causes designated broadcast program content to be recorded in the HDD 20 in such a way that the video data represented by the video signal decoded by the video decoder 202, and the audio data represented by the audio signal decoded by the audio decoder 206, and program content information of the broadcast program content are associated with each other. The recording process section 213 may obtain the program content information from an electronic program guide (EPG). Moreover, the recorded program content is reproduced by supplying, by the control section 220, the video signal and the audio signal of the recorded program content to the video process section 203 and the audio process section 207, respectively, from the HDD 20 where the recorded program content is thus recorded by the recording process section 213.

The control section 220 has a function of generating an image signal representing a menu screen, in addition to the above function. The image signal representing a menu screen, which is thus generated by the control section 220, is supplied to the video process section 203, and caused to be outputted from the display unit 205, like the video signal decoded by the turner 201. Moreover, the control section 220 may obtain, from a manufacturer server via the LAN interface 211, various information necessary to generate the image signal representing the menu screen. Furthermore, the control section 220 causes the menu screen to be transitionally displayed according to an RC signal received by the infrared receiving section 212.

The control section 220 is constituted by comprising a CPU (Central Processing Unit), a ROM (Read Only Memory), a RAM (Random Access Memory), and/or the like. The aforementioned functions are realized by the CPU executing a program recorded in the ROM, RAM, or the like.

<Menu Screen>

Next, the menu screen displayed on the display unit 205 by the TV 1 according to the present embodiment is described referring to FIG. 2. FIG. 2 is a screen configuration view illustrating a configuration of a menu screen 100 displayed on the display unit 205 by the TV 1.

The menu screen 100 is a screen displayed by the TV 1 when a home key provided on the RC 10 is pressed. As illustrated in FIG. 2, the menu screen 100 includes an info zone 110, a function and recommendation zone 120, and a net service zone 130. In the following, the information zone 110, the function and recommendation zone 120, and the net service zone 130 are described.

(Info Zone)

The info zone 110 is a zone for displaying various information, and may be referred to as an information displaying region, alternatively. The info zone 110 includes a user name displaying region 111, a notice list key 112*a*, a login key 112*b*, a setting key 112*c*, a time displaying region 113, a weather displaying region 114, a currently watching image displaying region 115, a banners 116*a* to 116*c*, a banner detail displaying region 116*d*, and an information displaying region 117.

The user name displaying region 111 is a region for displaying a user name. The TV 1 has a function of logging in a particular server offered by a manufacturer of the TV 1, or the like party (hereinafter, referred as a manufacturer server). The TV 1 is configured such that, when logged in the manufacturer server, a user name used in logging in is displayed in the user name displaying region 111. During the logging-in process, a character string indicting that the TV 1 is still in a log-out state ("Welcome Dear Guest" in FIG. 2) is displayed in the user name displaying region 111 by the TV 1 until the logging-in process is completed.

The notice list key 112*a* is a key for calling up a notice list screen. When the enter key of the RC 10 is pressed while the notice list key 112*a* is being highlighted, the TV 1 changes the screen displayed on the display unit from the menu screen 100 to a notice list screen. The notice list key 112*a* can be highlighted only when the TV 1 is connected to a network.

The login key 112*b* is a key for calling up a login screen. When the enter key of the RC 10 is pressed while the login key 112*b* is being highlighted, the TV 1 changes the screen displayed on the display unit from the menu screen 100 to a login screen. The login key 112*b* can be highlighted only when the TV 1 is connected to a network.

The setting key 112*c* is a key for calling up a setting screen. When the enter key of the RC 10 is pressed while the setting key 112*c* is being highlighted, the TV 1 changes the screen displayed on the display unit 205 from the menu screen 100 to a setting screen. The setting key 112*c* can be highlighted regardless of whether or not the TV 1 is connected to a network.

The time displaying region 113 is a region for displaying a current time. The display of the current time in the time displaying region 113 can be performed in any fashion. The present embodiment employs such a fashion that the current time is displayed as "AM :/** (year)  (month)  (day) * (day of week)" (here, "/" indicates line break) as illustrated in FIG. 2. The current time to be displayed in the time displaying region 113 may be for example obtained from a clock provided in the TV 1, or may be supplied from an NTP server to which the TV 1** is connected.

The weather displaying region 114 is a region for displaying weather information of a local area in which the TV 1 is located. How to display the weather information in the weather displaying region 114 can be performed in any fashion. The present embodiment employs such a fashion that a weather icon (a weather icon for sunny in the example illustrated in FIG. 2), a local area name ("Yaita City" in the example illustrated in FIG. 2), a comment ("Airborne pollen level is high" in the example illustrated in FIG. 2) are included in the display. The weather information to be displayed in the weather displaying region 114 may be obtained from a manufacturer server or the like, or may be extracted from data broadcast.

The currently watching image displaying region 115 is a region for performing a split-screen display of an image (moving image or still image) that has been full-screen displayed until just before the screen is changed to the menu screen 100. For example, if a certain broadcast program content is full-screen displayed until just before the screen is changed to the menu screen 100, the certain broadcast program content is continuously split-screen displayed in the currently watching image displaying region 115. If a certain recorded program content is full-screen displayed until just before the screen is changed to the menu screen 100, the certain recorded program content is continuously split-screen displayed in the currently watching image displaying region 115. If a certain web page is full-screen displayed until just before the screen is changed to the menu screen 100, the certain web page is continuously split-screen displayed in the currently watching image displaying region 115. The currently watching image displaying region 115 can be highlighted regardless of whether or not the TV 1 is connected to a network. When the enter key of the RC 10 is pressed while currently watching image displaying region 115 is being highlighted, the TV 1 stops the display of the menu screen 100 and resumes full-screen display and the currently watching image.

The banners 116*a* to 116*c* are banners provided from a manufacturer server, and may be, for example, advertising banners provided from the manufacturer server. The banners 116*a* to 116*c* can be highlighted regardless of whether or not the TV 1 is connected to a network. In the banner detail displaying regions 116*d*, detail information regarding a banner thus highlighted is displayed. The banners 116*a* to 116*c* and detail information regarding the banner 116*a* to 116*c* are downloaded from the manufacturer server while the TV 1 is connected to the network. Then, the banners 116*a* to 116*c* and their detail information are stored in the TV 1.

The information displaying region 117 is a region for displaying a character string provided from a manufacturer server. The character string is displayed in the information displaying region 117 in such a way that the character string flows from a right end to a left end of a frame of the information displaying region 117. After a last character of the character string goes out of the frame of the information displaying region 117 from the left end of the frame, a first character of the character string goes into the frame of the information displaying region 117 from the right end of the frame.

In the following explanation, selectable UI (User Interface) items among the UI items constituting the info zone 110 are collectively or generally referred to as menu items. Specifically, the notice list key 112*a*, the login key 112*b*, the setting key 112*c*, the currently watching image displaying region 115, and the banners 116*a* to 116*c* are menu items.

(Function and Recommendation Zone)

The function and recommendation zone 120 is a region for displaying a panel (hereinafter, referred to as function panel) 121 for various functions, and a panel (hereinafter, referred to as recommended content panel) 122 for various recommendation. The function and recommendation zone 120 may be referred to as a panel displaying region, alternatively. The function panel 121 and the recommended content panel 122 are aligned laterally in the function and recommendation zone 120.

The function panel 121 is a panel for the respective functions of the TV 1. When the enter key of the RC 10 is pressed while a certain function panel 121 is being highlighted, the TV 1 changes the screen displayed on the display unit from the menu screen 100 to a screen for using a function corresponding to the certain function panel 121.

In the present embodiment, the function panels 121 provided herein are a different-channel program content panel, a smart search panel, a recorded program content list panel, an input switching panel, a program guide panel, and a calendar panel. For example, when the enter key of the RC 10 is pressed while the different-channel panel is being highlighted, the control section 220 changes the screen displayed on the display unit 205 from the menu screen 100 to a different-channel program content selecting screen for selecting a program displayed on a different channel in the same time slot. Moreover, when the enter key of the RC 10 is pressed while the smart search panel is being highlighted, the control section 220 changes the screen displayed on the display unit 205 from the menu screen 100 to a screen for smart search. Moreover, when the enter key of the RC 10 is pressed while the recorded program content list panel is being highlighted, the control section 220 changes the screen displayed on the display unit 205 from the menu screen 100 to a screen for displaying a list of recorded program contents recorded in the HDD 20. Moreover, when the enter key of the RC 10 is pressed while the program guide panel is being highlighted, the control section 220 changes the screen displayed on the display unit 205 from the menu screen 100 to a program guide screen for displaying an electronic program guide.

The recommended content panel 122 is a panel for various recommendation contents (which may be a program content on a different channel in the same time slot, a not-yet broadcasted program content, a recorded program content, or a web page) selected by the TV 1. When the enter key of the RC 10 is pressed while a certain recommended content panel 122 is being highlighted, the control section 220 starts full-screen display of a recommended content corresponding to the certain recommended content panel (in case where the recommended content is a program on a different channel in the same time slot, a recorded program content, or a web page), or starts full-screen display of a content recording programming screen for programming the recording of the recommended content (in case where the recommended content is a not-yet broadcasted program content).

In the following explanation, selectable UI (User Interface) items among the UI items constituting the function and recommendation zone 120 are collectively referred to as menu items. Specifically, the function panel 121 and the recommended content panel 122 are menu items.

(Net Service Zone)

The net service zone 130 is a region for displaying an icon(s) 131 for a net service or net services. When the enter key of the RC 10 is pressed while an icon is being highlighted, the control section 220 changes the screen displayed on the display unit 205 from the menu screen 100 to a screen for using a net service corresponding to the icon 131 thus highlighted.

In the present embodiment, the icons 131 available are an IPTV icon, a photo/magazine icon, a shopping icon, a search/TV portal icon, a network video icon, a communication icon, a daily-life helpful information icon, a service list icon, and a bookmark icon.

The icons 131 for various net services are displayed only when the TV 1 is connected to a network via the LAN interface 211. It may be configured such that if the TV 1 is not connected to a network, a message for indicating that the TV 1 is not connected to a network, a key for calling up a video content for recommending connecting the TV 1 to a network, a key for calling up a network setting screen, or the like is displayed in the network service zone 130.

In the following explanation, selectable UI (User Interface) items among the UI items constituting the net service zone 130 are collectively or generally referred to as menu items. Specifically, the icons 131 are menu items.

(Display Screen Transition)

Next, display screen transition on the TV 1 is described, referring to FIG. 3. FIG. 3 is a display screen-transition view illustrating display screen transition on the TV 1.

When the home key of the RC 10 is pressed while a currently watching image such as broadcast program content or the like is full-screen displayed, the control section 220 changes the screen displayed on the display unit 205, as illustrated in FIG. 3, from the currently watching image (full-screen display) to the menu screen 100.

Generally, states of the menu screen 100 can be divided into an info zone highlighted state, a function and recommendation zone highlighted state, and a net service zone highlighted state. Here, the info zone highlighted state is a state in which at least one of the menu items included in the info zone 110 is highlighted. The function and recommendation zone highlighted state is a state in which at least one of the menu items included in the function and recommendation zone 120 is highlighted. The net service zone highlighted state is a state in which at least one of the menu items included in the net service zone 130 is highlighted. In any of the states, the menu item being highlighted is distinguished from the other menu items by a focusing frame framing the menu item being highlighted.

When the rightward key of the RC 10 is pressed in the info zone highlighted state in which a certain menu item is being highlighted, the control section 220 changes the highlighted menu item from the certain menu item to a menu item located rightward next to the certain menu item. Similarly, when the leftward key of the RC 10 is pressed in the info zone highlighted state in which a certain menu item is being highlighted, the control section 220 changes the highlighted menu item from the certain menu item to a menu item located leftward next to the certain menu item. The change of the highlighted menu item in the info zone highlighted state is carried out by moving the position of the focusing frame, not by changing the position of the menu items.

When the downward key of the RC 10 is pressed in the info zone highlighted state, the control section 220 changes, as illustrated in FIG. 3, the state of the menu screen 100 from the info zone highlighted state to the function and recommendation zone highlighted state. On the contrary, when the upward key of the RC 10 is pressed in the function and recommendation zone highlighted state, the control section 220 changes the state of the menu screen 100 from the function and recommendation zone highlighted state to the info zone highlighted state.

When the rightward key of the RC 10 is pressed in the function and recommendation zone highlighted state in which a certain menu item is being highlighted, the control section 220 changes the highlighted menu item from the certain menu item to a menu item located rightward next to the certain menu item. Similarly, when the leftward key of the RC 10 is pressed in the function and recommendation zone highlighted state in which a certain menu item is being highlighted, the control section 220 changes the highlighted menu item from the certain menu item to a menu item located leftward next to the certain menu item. The change of the highlighted menu item in the function and recommendation zone highlighted state is carried out by not moving the position of the focusing frame, but by changing the positions of the menu items.

When the downward key of the RC 10 is pressed in the function and recommendation zone highlighted state, the control section 220 changes, as illustrated in FIG. 3, the state of the menu screen 100 from the function and recommendation zone highlighted state to the net service zone highlighted state. On the contrary, when the upward key of the RC 10 is pressed in the net service zone highlighted state, the control section 220 changes the state of the menu screen 100 from the net service zone highlighted state to the function and recommendation zone highlighted state.

When the rightward key of the RC 10 is pressed in the net service zone highlighted state in which a certain menu item is being highlighted, the control section 220 changes the highlighted menu item from the certain menu item to a menu item located rightward next to the certain menu item. Similarly, when the leftward key of the RC 10 is pressed in the net service zone highlighted state in which a certain menu item is being highlighted, the control section 220 changes the highlighted menu item from the certain menu item to a menu item located leftward next to the certain menu item. The change of the highlighted menu item in the net service zone highlighted state is carried out by moving the position of the focusing frame, not by changing the position of the menu items.

When the return key, the home key, or the end key of the RC 10 is pressed while the menu screen 100 is being displayed, the control section 220 ends the display of the menu screen 100 and resumes the full-screen display of the currently watching image.

When the enter key of the RC 10 is pressed while any one of the function panels 121 is being highlighted, the control section 220 changes the screen displayed on the display unit 205 from the menu screen 100 to a screen for using a function corresponding to the function panel 121. For example, when the enter key of the RC 10 is pressed while the recorded program content list panel is being highlighted, the control section 220 changes the screen displayed on the display unit 205 from the menu screen 100 to the recorded program list screen. Moreover, when the enter key of the RC 10 is pressed while the smart search panel is being highlighted, the control section 220 changes the screen displayed on the display unit from the menu screen 100 to the smart search screen 600.

When the return key of the RC 10 is pressed while the different-channel program content selecting screen, the smart search screen 600, or the like is being displayed, the control section 220 changes the screen displayed on the display unit 205 from such a screen to the menu screen 100. Moreover, when the home key or the end key of the RC 10 is pressed while the different-channel program content selecting screen, the smart search screen 600, or the like is being displayed, the control section 220 ends the display of such a screen and resumes the full-screen display of the currently watching image.

It is preferable that the focusing frame framing the highlighted menu item blinks. The blinking of the focusing frame may be carried out with a blinking cycle of 0.5 Hz, for example. With this configuration, it becomes easy for a user to recognize which menu item is being highlighted even from among colorful item menus. However, in this configuration, if the focusing frame is in a dark state when the focusing frame is being moved, it would be difficult for a user to note that the focusing frame is moved. Therefore, in this present embodiment, this problem is solved by adopting a configuration in which the focusing frame is reset to a bright state every time the focusing frame is moved. Moreover, the focusing frame may be in any color, while the focusing frame is yellow in the present embodiment, thereby improving visibility of the focusing frame when a background color is black.

<Internal Configuration of Control Section>

Figure 4:
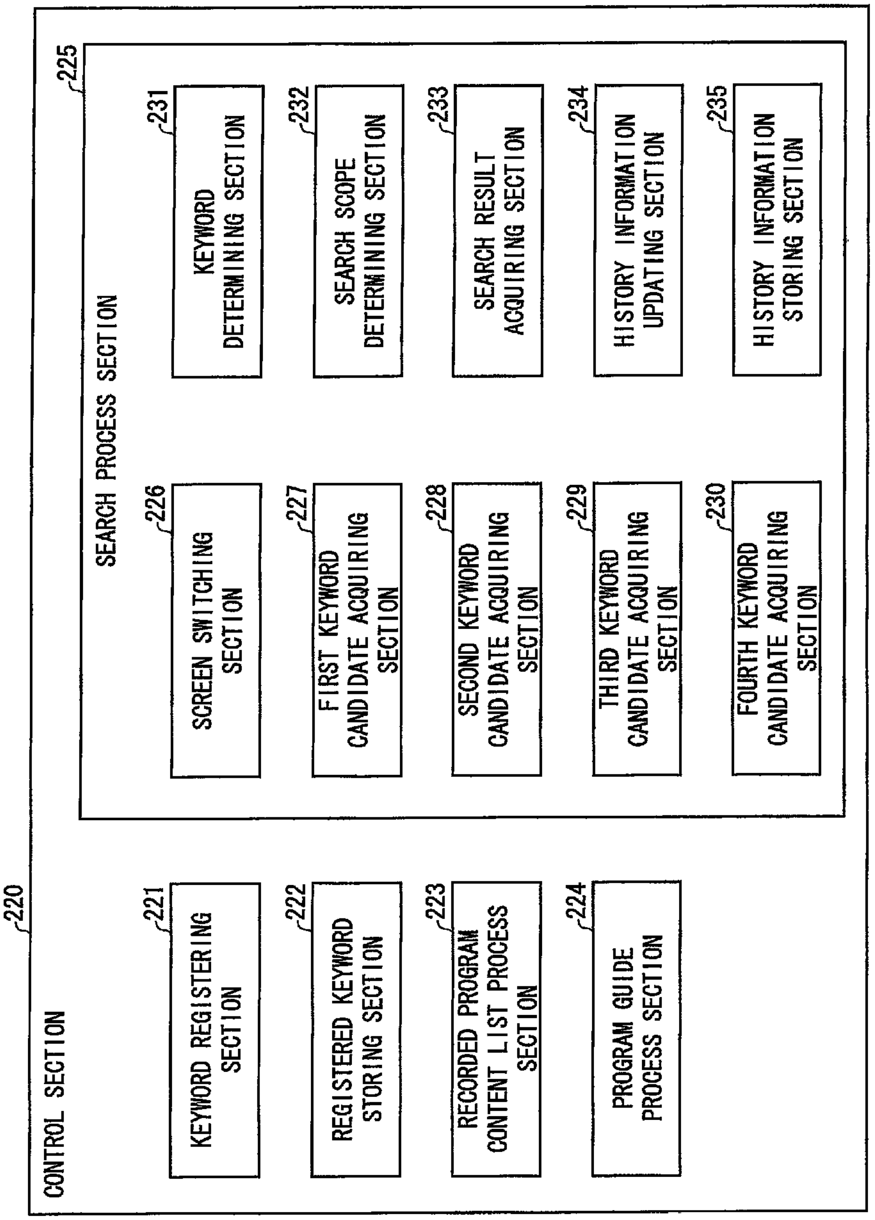
FIG. 4 is a block diagram illustrating an internal configuration of a control section provided in the television illustrated in FIG. 1.

Next, an internal configuration of the control section 220 is explained in detail, referring to FIG. 4. FIG. 4 is a block diagram illustrating the internal configuration of the control section 220. Here, the explanation only explains only a process using the recorded program content screen, a process using the program guide screen, a configuration relating to search process using the smart search screen 600, while omitting explanation on the other configuration. As illustrated in FIG. 4, the control section 220 includes a keyword registering section 221, a registered keyword storing section 222, a recorded program content list process section 223 for performing a process using the recorded program content list screen, a program guide process section 224 for performing a process using the program guide screen, and a search process section 225 for performing a search process using the smart search screen 600.

(Keyword Registering Section)

The keyword registering section 221 is configured to cause a keyword designated by a user to be stored in the registered keyword storing section 222 as a registered keyword. In an initial setting screen displayed on the display unit 205 when the TV 1 is firstly turned on after being purchased, the keyword registering section 221 requests input of a keyword preferred by the user, and registers an inputted keyword as the registered keyword. The keyword registering section 221 is capable of being instructed to change the registered keyword. The keyword registering section 221 may be configured such that, when the keyword registering section 221 is instructed to change the registered keyword to another keyword, the keyword registering section 221 causes the registered keyword stored in the registered keyword storing section 22 to be displayed, and requests an input of a keyword to replace the registered keyword. According to the input by the user, the keyword registering section 221 changes the registered keyword to another keyword.

In the present embodiment, the keyword registering section 221 is capable of registering a first predetermined number (for example, 5 (five)) of registered keywords at maximum.

The registered keyword stored in the registered keyword storing section 222 is used in various functions such as generating a different-channel program content selecting screen for recommending a program content on a different channel in the same time slot.

(Recorded Program Content List Process Section)

The recorded program content list process section 223 causes the display unit 205 to display a recorded program content list screen for displaying a list of recorded program contents stored in the HDD 20. The recorded program content list process section 223 is configured to start its process when the enter key of the RC 10 is pressed while the recorded program content list panel is being highlighted on the menu screen 100 as illustrated in FIG. 2.

The recorded program content list process section 223 is capable of being instructed to cause selected one of the recorded program contents to be reproduced. The recorded program content list process section 223 is configured such that, when the recorded program content list process section 223 is instructed to cause the reproduction of a selected recorded program content, the recorded program content list process section 223 sends a video signal and an audio signal of the selected recorded program content to the video process section 203 and the audio process section 207, respectively, and causes the recorded program content list screen to disappear and the display unit 205 to display a reproduced video.

Moreover, the recorded program content list process section 223 is capable of being instructed to perform search process based on an inputted keyword. The recorded program content list process section 223 is configured such that, when the recorded program content list process section 223 is instructed to perform search process, the recorded program content list process section 223 extracts, from among recorded program contents, a recorded program content(s) including the keyword in its/their program content information. Then, the recorded program content list process section 223 outputs, to the display unit 205 or the like, a list (extracted recorded program content list) of the recorded program content(s) thus extracted.

(Program Guide Process Section)

The program guide process section 224 is configured to cause the display unit 205 to display a program guide screen for showing an electronic program guide received via an antenna. The program guide process section 224 is configured to start its process when the enter key of the RC 10 is pressed while the program guide panel is being highlighted on the menu screen 100 as illustrated in FIG. 2.

The program guide process section 224 is capable of being instructed to cause channel switching to a channel thus selected, or cause program content information to be displayed. The program guide process section 224 is configured such that when the program guide process section 224 is instructed to cause channel switching, the program guide process section 224 controls the video process section 203 and the audio process section 207 to respectively output a video signal and an audio signal of a broadcast program content on the channel thus selected, and causes the display unit 205 to display the broadcast program content thereon. Moreover, the program guide process section 224 is configured such that when the program guide process section 224 is instructed to cause program content information of a selected broadcast program content to be displayed, the program guide process section 224 causes the display unit 205 to display the program content information of the selected broadcast program content.

Further, the program guide process section 224 is capable of being instructed to perform search process based on an inputted keyword. The program guide process section 224 is configured such that when the program guide process section 224 is instructed to perform search process, the program guide process section 224 extracts, from among broadcast program contents included in the electronic program guide, a broadcast program content(s) whose program content information includes the keyword, and the program guide process section 224 outputs, to the display unit 205 or the like, a list (extracted broadcast program content list) of the broadcast program content(s) thus extracted.

(Search Process Section)

Next, the search process section 225 for performing search process using the smart search screen 600 is explained. As illustrated in FIG. 4, the search process section 225 includes a screen switching section 226, a first keyword candidate acquiring section (keyword candidate acquiring means) 227, a second keyword candidate acquiring section (keyword candidate acquiring means) 228, a third keyword candidate acquiring section (keyword candidate acquiring means) 229, a fourth keyword candidate acquiring section (keyword candidate acquiring means) 230, a keyword determining section (keyword determining means) 231, a search scope determining section (search scope determining means) 232, a search result acquiring section (search result acquiring means) 233, a history information updating section 234, and a history information storing section 235.

The screen switching section 226 is configured to perform a process for switching the screen displayed on the display unit 205 to a smart search screen 600 for performing the search process. The screen switching section 226 divides the screen displayed on the display unit 205 to (a) a first region for performing split-screen display of a currently watching image (moving image or still image) that has been full-screen displayed until just before the screen is changed to the menu screen 100, and (b) a second region for search process. For example, the screen switching section 226 splits the screen of the display unit 205 into a right portion and left portion, wherein the left portion is the first region and the right portion is the second region.

In case where a broadcast program content has been full-screen displayed until just before changing the screen to the menu screen 100, the broadcast program content is continuously split-screen displayed in the first region as a currently watching image. Moreover, in case where a recorded program content has been full-screen displayed until just before changing the screen to the menu screen 100, the recorded program content is continuously displayed in the first region as a currently watching image. Furthermore, in case where a web page has been full-screen displayed until just before changing the screen to the menu screen 100, the web page is continuously displayed in the first region as a currently watching image. This configuration allows a user to perform the search process in the second region while watching the currently watching image in the first region.

The first keyword candidate acquiring section 227 is configured to acquire a first keyword candidate according to a first algorithm, which sets the first keyword candidate is a program content name (title) in program content information corresponding to a program content selected as the currently watching image. The program content selected as the currently watching image is a broadcast program content on a channel having been selected until just before changing the screen to the menu screen 100 or a recorded program content. The first keyword candidate acquiring section 227 is configured such that, in case the currently watching image is a recorded program content recorded in the HDD 20, the first keyword candidate acquiring section 227 retrieves program content information of the recorded program content from the HDD 20, and acquires the first keyword candidate from the program content information. Moreover, the first keyword candidate acquiring section 227 is configured such that, in case the currently watching image is a broadcast program content received via an antenna, the first keyword candidate acquiring section 227 extracts program content information of the broadcast program content from the electronic program guide, and acquires the first keyword candidate from the program content information.

In case a web page is selected as the currently watching image, the first keyword candidate acquiring section 227 generates a first keyword candidate indicated as being not selectable.

The second keyword candidate acquiring section 228 is configured to acquire a second keyword candidate according to a second algorithm, which sets the second keyword candidate is a cast name(s) in the program content information of the program content selected as the currently watching image, the cast name being a name of a cast or the like appearing in the program content. The second keyword candidate acquiring section 228 is configured such that, in case the currently watching image is a recorded program content recorded in the HDD 20, the second keyword candidate acquiring section 228 retrieves program content information of the recorded program content from the HDD 20, and acquires the second keyword candidate from the program content information. Moreover, the second keyword candidate acquiring section 228 is configured such that, in case the currently watching image is a broadcast program content received via an antenna, the second keyword candidate acquiring section 228 extracts program content information of the broadcast program content from the electronic program guide, and acquires the second keyword candidate from the program content information.

The second keyword candidate acquiring section 228 outputs a second predetermined number (for example, 3 (three) of second keyword candidates. That is, if the cast names in the program content information outnumbers the second predetermined number, the second keyword candidate acquiring section 228 acquires, as the second keyword candidates, cast names of the second predetermined number, listed from a top of a list of the cast names. If the cast names in the program content information is less than the second predetermined number, the second keyword candidate acquiring section 228 acquires the cast names indicted in the program content information and generates a second keyword candidate(s) indicated as being not selectable, thereby making up second keyword candidates of the second predetermined number in total to output.

The second keyword candidate acquiring section 228 generates a second keyword candidate(s), which is/are indicated as being not selectable, of the second predetermined number, when a webpage is selected as the currently watching image.

The third keyword candidate acquiring section 229 is configured to acquire a third keyword candidate according to a third algorithm, which sets the third keyword candidate is a registered keyword(s) registered in the registered keyword storing section 222 in advance. As explained above, the first predetermined number (for example, 5 (five)) or less of the registered keyword(s) is/are registered in the registered keyword storing section 222. If the registered keyword(s) registered in the registered keyword storing section 222 is less than the first predetermined number, the third keyword candidate acquiring section 229 generates, as many as necessary, a third keyword candidate(s) indicated as being not selectable, thereby making up third keyword candidates of the first predetermined number in total to output.

The fourth keyword candidate acquiring section 230 acquires a fourth keyword candidate according to a fourth algorithm, which sets the fourth keyword candidate is a previously-searched keyword used in previously-performed searching and stored in the history information storing section 235. Here, the fourth keyword candidate acquiring section 230 is configured to output fourth keyword candidates of a third predetermined number (for example, 5 (five)). Therefore, if the number of the previously-searched keywords stored in the history information storing section 235 outnumbers the third predetermined number, the fourth keyword candidate acquiring section 230 acquires, as the fourth keyword candidates, previously-searched keywords of the third predetermined number which are searched most frequently according to searching frequencies recorded in association with the previously-searched keywords. On the other hand, if the number of the previously-searched keywords stored in the history information storing section 235 is less than the third predetermined number, the fourth keyword candidate acquiring section 230 generates, as many as necessary, a fourth keyword candidate(s) indicated as being not selectable, thereby making up fourth keyword candidates of the third predetermined number in total to output.

The keyword determined section 231 causes the first to fourth keyword candidate acquiring section 227 to 230 to perform the respective keyword candidate acquiring process, causes a list (hereinafter, referred to as a keyword list) of items including the keyword candidates thus acquired to be displayed in the second region, thereby promoting a user to determine a keyword(s). In displaying the keyword list, the keyword determining section 231 displays the keyword list to which an entry field including a search keyword input text box for inputting a search keyword is added in addition to the first to fourth keyword candidates.

The keyword determining section 231 is configured such that when the entry key of the RC 10 is pressed while any one of items in the keyword list is being highlighted, the keyword determining section 231 determines, as searching keyword, a keyword candidate belonging to the item thus selected. Moreover, the keyword determining section 231 is configured such that when the entry key of the RC 10 is pressed while the entry field is being highlighted, the keyword determining section 231 causes a software keyboard to be displayed, via which a keyword is set according to user input. When an input complete key on the software keyboard is pressed, the keyword determining section 231 determines, as a search keyword, a keyword inputted in the entry field. Then, the keyword determining section 231 outputs the search keyword thus determined, to the search result acquiring section 233.

The keyword determining section 231 causes the first to fourth keyword candidate acquiring sections 227 to 230 to perform the keyword candidate acquiring processes when the smart search panel is selected on the menu screen 100. Moreover, the keyword determining section 231 is configured such that when the currently watching image is a broadcast program content or a recorded program content, the keyword determining section 231 identifies ending time of the program content based on program content information of the broadcast program content or the recorded program content, and causes the first to fourth keyword candidate acquiring sections 227 to 230 to perform the keyword candidate acquiring processes, even after the ending time thus identified.

The search scope determining section 232 determines a search scope of the searching and outputs search scope information to the search result acquiring section 233, the search scope information indicating the search scope thus determined. In the present embodiment, the search scope determining section 232 determines one of the following four search scopes: (1) Internet search whose search scope covers web pages on the Internet; (2) VOD search whose search scope covers digital video images available via a Video-On-Demand (VOD) system; (3) recorded program content list search whose search scope covers recorded program contents stored in the HDD20; and (4) program guide search whose search scope covers the electronic program guide. The search scope determining section 232 displays a list (hereinafter, referred to as a search scope list) of icons for selecting the search scope, which icons represent the four search scopes, respectively. The search scope determining section 232 determines one of the search scopes, which is selected by a user.

If no network connection (Internet connection) via the LAN interface 211 is not established, the icons for selecting the Internet search and the VOD search are made unavailable by the search scope determining section 232. Moreover, if the HDD 20 is not connected with the USB terminal 214, the icon for selecting the recorded program content list search is made unavailable by the search scope determining section 232.

The search result acquiring section 233 receives the search scope information from the search scope determining section 232, and activates an application for performing search process of the search scope indicated by the search scope information and causes the application to perform the search process based on the search keyword determined by the keyword determining section 231.

More specifically, the search result acquiring section 233 is configured such that, if the search scope information indicates the Internet search, the search result acquiring section 233 causes a web browser, and acquires a search result from a WWW server by adding the search keyword to URL of a predetermined search engine thereby performing URL encoding of the search keyword so as to designate the URL with the search keyword.

The search result acquiring section 233 is configured such that, if the search scope information indicates the VOD search, the search result acquiring section 233 also causes a web browser to activate, and acquires a search result from a WWW server by adding the search keyword to URL of a predetermined web page for VOD search thereby performing URL encoding of the search keyword so as to designate the URL with the search keyword.

Moreover, the search result acquiring section 233 is configured such that, if the search scope information indicates the recorded program content list search, the search result acquiring section 233 causes the recorded program content list process section 223 to perform the recorded program content list search with the search keyword. As a result of this, the recorded program content list process section 223 outputs a search result to the search result acquiring section 233, the search result being an extracted recorded program content list, which is a list of recorded program contents extracted based on the search keyword from the HDD 20. In this way, the search result acquiring section 233 can acquire the search result thus outputted.

The search result acquiring section 233 is configured such that, if the search scope information indicates the program guide search, the search result acquiring section 233 causes the program guide process section 224 to perform the program guide search with the search keyword. As a result of this, the program guide process section 224 outputs a search result to the search result acquiring section 233, the search result being an extracted broadcast program content list, which is a list of broadcast program contents extracted based on the search keyword from the electronic program guide. In this way, the search result acquiring section 233 can acquire the search result thus outputted.

The search result acquiring section 233 causes the display unit 205 to display the search result thus acquired, in the second region or on full screen thereof.

The history information updating section 234 is configured to register a search keyword as a previously-searched keyword when the search result acquiring section 233 causes the search result to be displayed, the search keyword being determined by the keyword determining section 231. Specifically, the history information updating section 234 registers, in the history information storing section 235, the previously-searched keyword in association with search frequency of "one time" if the previously-searched keyword to be registered has not been registered as a previously-searched keyword. If the previously-searched keyword to be registered has been registered as a previously-searched keyword before, the history information updating section 234 updates the history information storing section 235 by increasing, by one, search frequency associated with the previously-searched keyword. In this way, the history information storing section 235 accumulates therein (i) keywords having been previously searched by search process using the smart search, and (ii) search frequency indicating how many time the search keyword has been searched previously.

<Flow of Process of Search Process Section>

Figure 5:
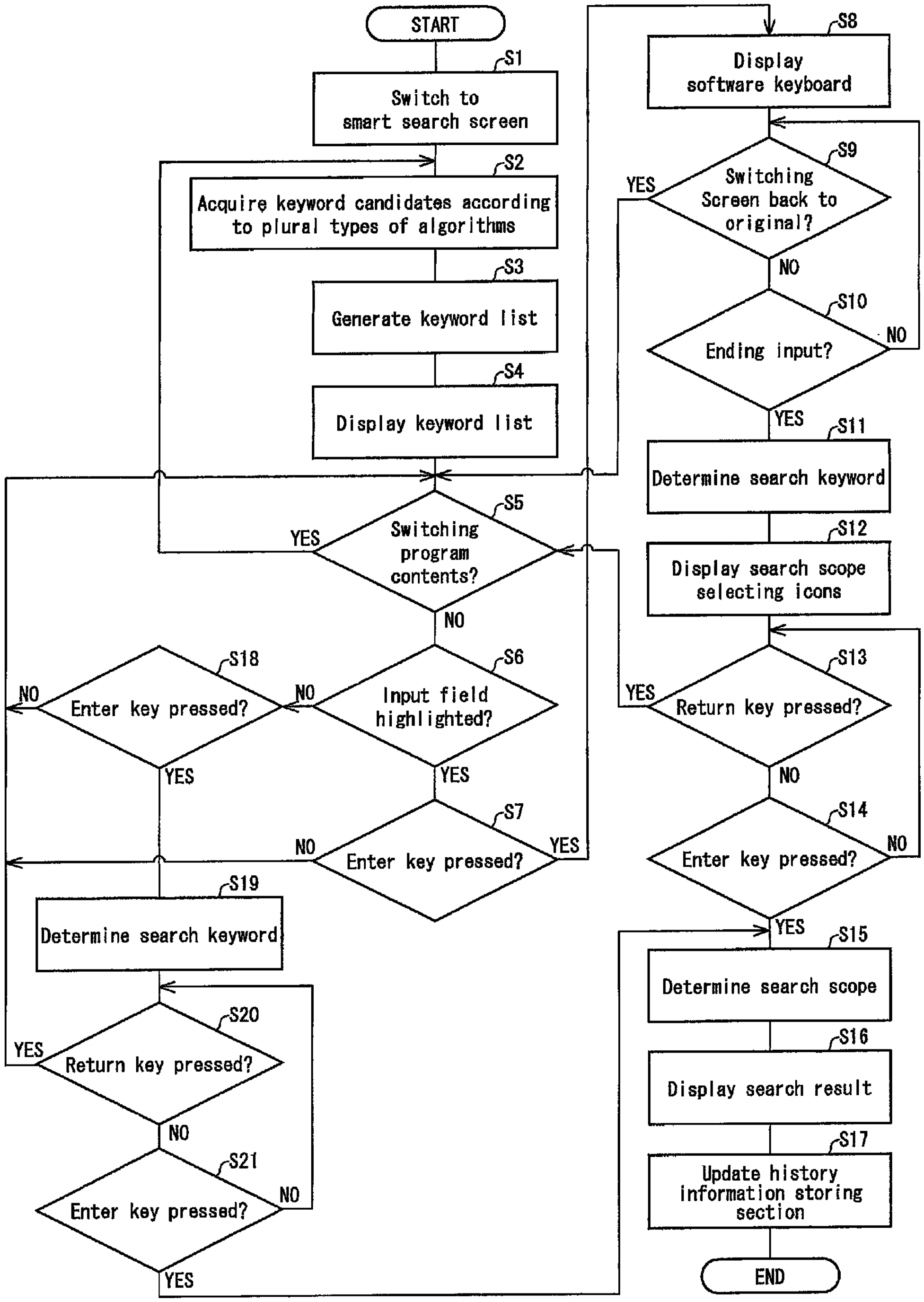
FIG. 5 is a flowchart illustrating a flow of a specific process of a search process section provided in the control section illustrated in FIG. 4.
Figure 7:
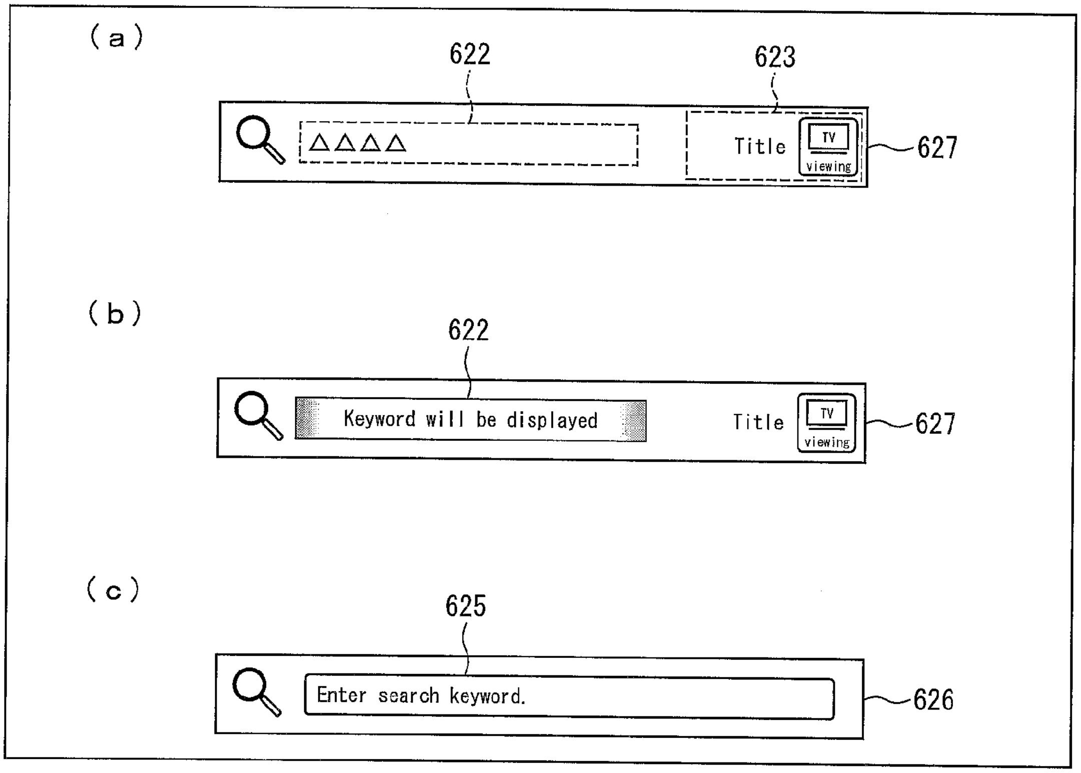
FIG. 7 is a view illustrating examples of fields in a keyword list displayed. (a) illustrates an item field including keyword candidates. (b) illustrates an item field indicating that this field cannot be selected. (c) illustrates an input field.
Figure 8:
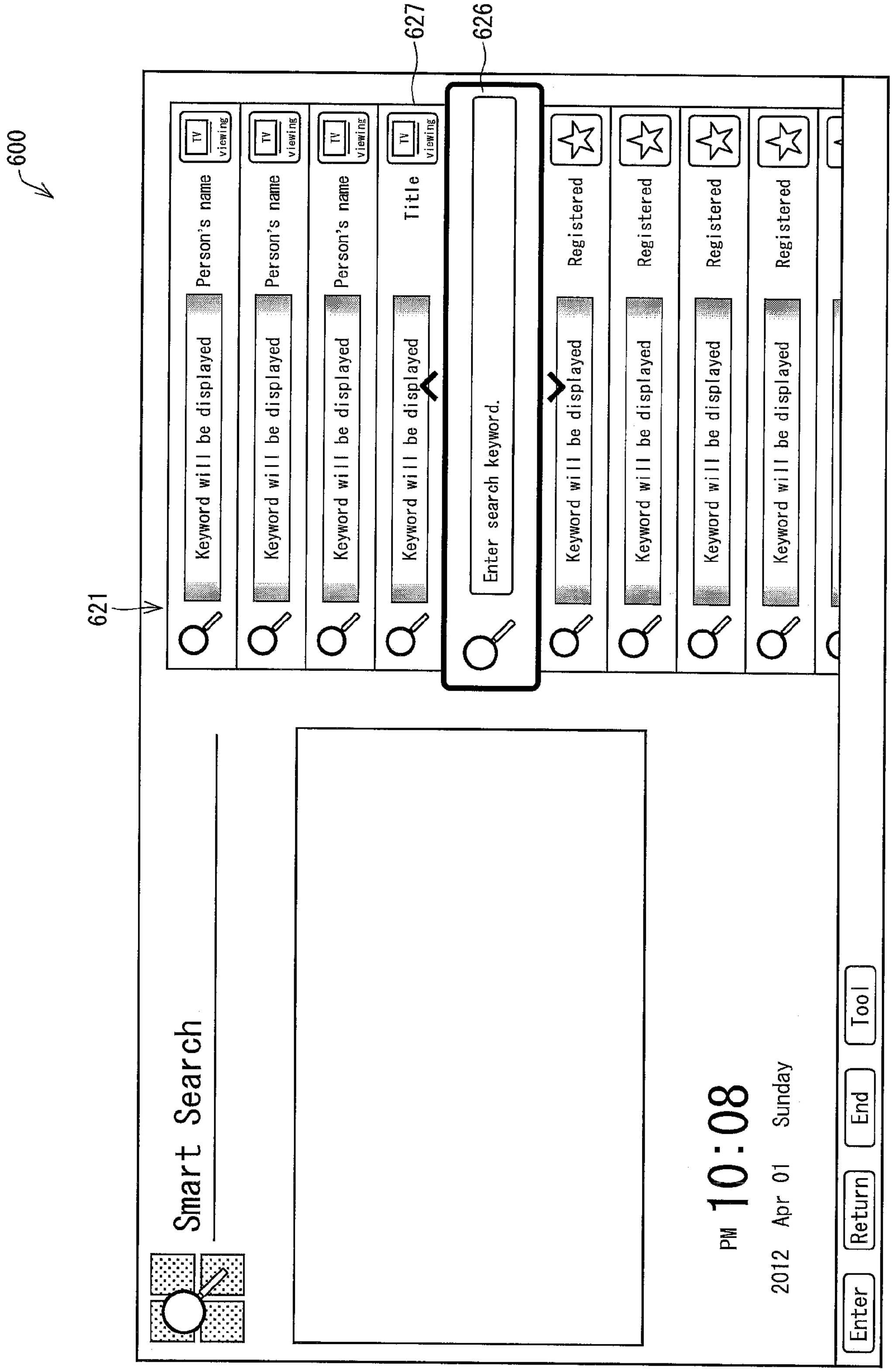
FIG. 8 is a view illustrating one example of a smart search screen displayed when the television is in an initial state.
Figure 9:
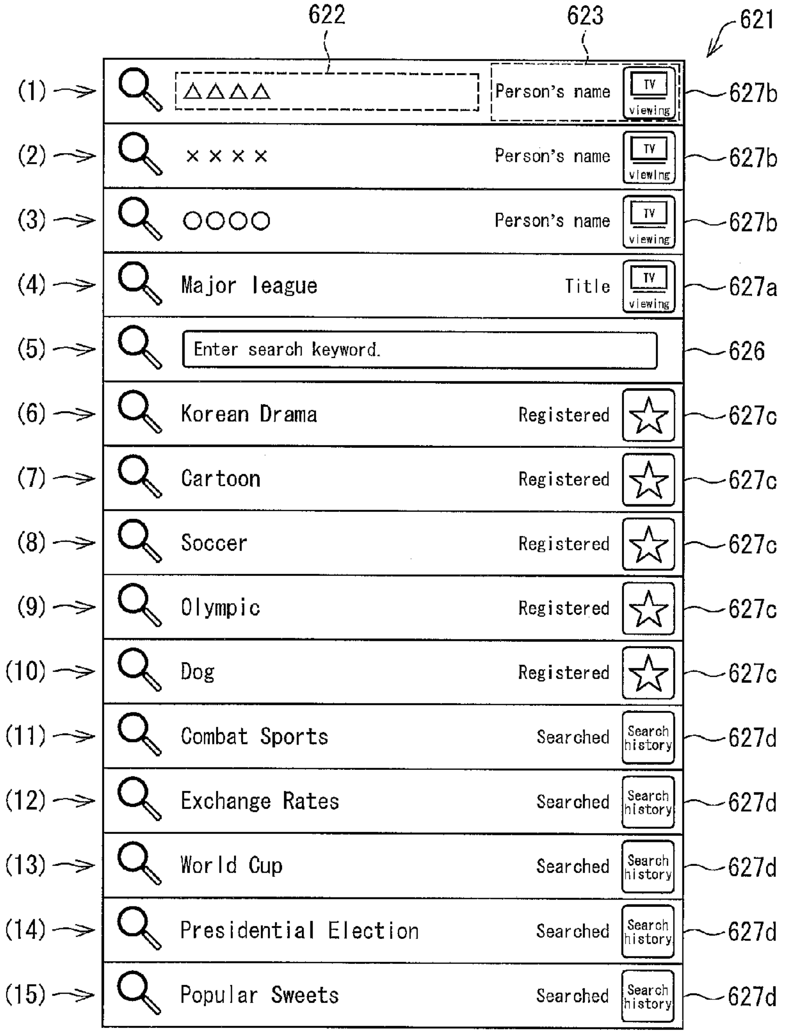
FIG. 9 is a view for explaining an order of displaying fields included in a keyword list. (a) illustrates a table illustrating a table for showing the order of the fields in the keyword list, and (b) illustrates one example of the keyword list.

Next, a concrete example of the process performed by the search process section 225 is explained referred to FIGS. 5 to 19. FIG. 5 is a flowchart illustrating the process of the search process section 225. FIGS. 6, 8, 10, 11, to 13 to 19 illustrate examples of display screens displayed on the display unit 205. FIG. 7 illustrates an example of a filed included in a keyword list. (a) is an item field including a keyword candidate. (b) is an item field indicating being "not selectable". (c) is an input field. FIG. 9 is a view illustrating a keyword list. FIG. 12 is a view illustrating a table for determining whether an icon for search scope selection is selectable or not.

(Step (S) 1)

When the entry key of the RC 10 is pressed while the smart search panel is being highlighted on the menu screen 100, the screen switching section 226 splits the screen displayed on the display unit 205 into the first region and the second region (S1). For example, as illustrated in FIG. 6, a left-side half of the screen becomes a first region 61 for displaying a currently watching image, and a right-side half of the screen becomes a second region 62. In this way, it becomes possible to perform search process while watching the currently watching image in the first region 61.

As illustrated in FIG. 6, the first region 61 includes a currently watching image displaying region 611 for performing split-screen display of the currently watching image, a program content information displaying region 612 for displaying program content information in case the currently watching image is a broadcast program content or a recorded program content, a time displaying region 613 for displaying current time, an illustration displaying region 614 for displaying illustration such as symbol, pattern, or the like indicating that the screen is a smart search screen, and a title displaying region 615 for displaying a title of the smart search screen.

The screen switching section 226 causes the currently watching image to be displayed in the currently watching image displaying region 611, the currently watching image being an image (such as a broadcast program content, a recorded program content, or a web page) having been full-screen displayed until just before the screen is changed to the menu screen 100.

Moreover, the screen switching section 226 is configured such that, when the currently watching image is a broadcast program content, the screen switching section 226 extracts program content information of the broadcast program content from the electronic program guide, and causes the extracted program content information to be displayed in the program content information displaying region 612. The screen switching section 226 is configured such that, when the currently watching image is a recorded program content, the screen switching section 226 extracts program content information of the recorded program content from the HDD 20, and causes the extracted program content information to be displayed in the program content information displaying region 612.

Moreover, the screen switching section 226 causes current time to be displayed in the time displaying region 613, the current time having been acquired from a clock built in the TV 1 or from an NTP server connected to the TV 1. The current time can be displayed in any fashion. In the present embodiment, the current time is displayed as "AM : /** (year)  (month)  (day) ******* (day of week) (here, "/" indicates line break), as illustrated in FIG. 6.

Further, the screen switching section 226 causes a present icon image to be displayed in the icon displaying region 614, and causes a present text to be displayed in the title displaying region 615 (the preset text is "smart search" in the present embodiment).

(Step (S) 2)

Next, the keyword determining section 231 is configured to cause the first to fourth keyword candidate acquiring sections 227 to 230 to perform output process of the keyword candidates (S2). As described above, the first to fourth keyword candidate acquiring section 227 to 230 acquire respective keyword candidates according to different algorithms.

Here, the first keyword candidate acquiring section 227 outputs one first keyword candidate (program content name). The second keyword candidate acquiring section 228 outputs second keyword candidates (cast names) of, for example, the second predetermined number, which is three (3) here. If the currently watching image is a web page, the first and second keyword candidate acquiring sections 227 and 228 generate first and second keyword candidates indicating being "not selectable", respectively. If the number of the casts included in the program content information is less than 3, the second keyword candidate acquiring section 228 generates, as many as necessary, a second keyword candidate(s) indicating being not selectable.

Moreover, the third keyword candidate acquiring section 229 outputs third keyword candidates (registered keywords) of, for example, the first predetermined number, which is five (5) here. If the registered keywords stored in the registered keyword storing section 222 are 4 or less, the third keyword candidate acquiring section 229 generates, as many as necessary, a third keyword candidate(s) indicating being not selectable.

Further, the fourth keyword candidate acquiring section 230 outputs fourth keyword candidates (previously-searched keywords) of, for example, the third predetermined number, which is five (5) here. If the previously-search keywords stored in the history information storing section 235 are 4 or less, the fourth keyword candidate acquiring section 230 generates, as many as necessary, a fourth keyword candidate(s) indicating being not selectable.

(Step (S) 3)

Next, the keyword determining section 231 generates a keyword list in which fourteen (14) fields each respectively containing keyword candidates acquired from the first to fourth keyword candidate sections 227 to 230 are listed (S3). The keyword determining section 231 generates the keyword list in such a way that the keyword list includes an input field including a search keyword input text box for user input of a search keyword.

(a) of FIG. 7 illustrates a display example of an item field 627 including a keyword candidate that is selectable. (b) of FIG. 7 illustrates a display example of an item field 627 including a keyword that indicates being not selectable. As illustrated in FIG. 7, the item field 627 includes a keyword candidate displaying region 622 for displaying a keyword candidate, and an icon displaying region 623 for displaying an algorithm type icon for indicting an algorithm for acquiring the keyword candidate.

The keyword determining section 231 causes a text "A search word is displayed" to be displayed in the keyword candidate displaying region 622 in the item field 627 for a keyword candidate indicating being not selectable. As to the item field 627 other than that, the keyword determining section 231 causes a text of the keyword candidate to be displayed in the keyword candidate displaying region 622. Moreover, the keyword determining section 231 causes algorithm type icons to be displayed in the icon displaying region 623 as follows: for the first keyword candidate, an algorithm type icon containing an illustration indicating the currently watching image ("Watching TV broadcast in FIG. 7) with a text "title"; for the second keyword candidate, an algorithm type icon containing illustration indicating the currently watching image ("Watching TV broadcast in FIG. 7) "name of person"; for the third keyword candidate, an algorithm type icon containing illustration indicating the registered keyword (star mark in FIG. 7) with a text "Registered"; and for the fourth keyword candidate, an algorithm type icon containing an illustration indicating the previously-searched keyword ("search history" in FIG. 7) with a text "past".

(c) of FIG. 7 illustrates a display example of the input field 626. As illustrated in (c) of FIG. 7, the input field 626 includes the search keyword input text box 625 for user input of a search keyword.

The keyword determining section 231 generates a keyword list in which the fourteen (14) item fields 627 and the input field 626 are listed in a descending order illustrated in (a) in FIG. 9. (b) of FIG. 9 is a view illustrating one example of the keyword list 621. Here, three (3) item fields 627*b* for the second keyword candidates, one (1) item field 627*a* for the first keyword candidate, the input field 626, five (5) item fields 627*c* for the third keyword candidates, and five (5) item fields 627*d* for the fourth keyword candidates are listed in this descending order. In the following, the item fields are referred to as the item fields 627 collectively when the item fields 627*a* to 627*d* are not particularly distinguished from each other.

(Step (S) 4)

Next, the keyword determining section 231 causes the keyword list 621 to be displayed in the second region (S4), as illustrated in FIG. 6. In the present embodiment, the keyword determining section 231 does not cause the entire keyword list 621 to be displayed in the second region 62 at a time but causes the keyword list 621 to be scroll-displayed wherein only part of the keyword list 621 (in the present embodiment, nine (9) of the fields 626 and 627 as illustrated in FIG. 6) is displayed in the second region 621 at a time and the keyword list 621 is scrolled according to user's scroll instruction. In this way, all the fields 626 and 627 on the keyword list 621 can be viewed by a user.

The keyword determining section 231 causes the keyword list 621 as illustrated in (b) of FIG. 9 to be displayed in such a way that another identical keyword list 621 is present above the item field 627 of (1). That is, downward scrolling causes the item fields 627 in such a way that the item field 627 of (15) comes over the item field 627 of (1), and then the item field 627 of (14) comes over the item field 627 of (15), . . . . In this way, the scrolling causes the identical keyword list 627 repeatedly.

Moreover, the keyword determining section 231 causes a focusing frame 624 to be displayed as illustrated in FIG. 6, the focusing frame 624 being for selecting one of the fields on the keyword list 621. The focusing frame 624 is fixed at a certain position in the second region 62. In the example illustrated in FIG. 6, the focusing frame 624 is displayed fixedly at a position substantially at the middle of a height of the second region 62, that is, at a position for framing a fifth field from the top of the nine (9) fields on the keyword list 621 displayed in the second region 62. When the upward key of the RC 10 is pressed, the keyword determining section 231 scrolls the keyword list 621, so that a field just above the field being framed in the focusing frame 624 comes into the focusing frame 624. When the downward key of the RC 10 is pressed, the keyword determining section 231 scrolls the keyword list 621, so that a field just below the field being framed in the focusing frame 624 comes into the focusing frame 624.

However, the keyword determining section 231 scrolls the keyword list 621 in such a way that an item field 627 which corresponds to a keyword candidate indicating as being not selectable is skipped from being inside the focusing frame 624. For example, when the upward key is pressed in case where a certain item field 627 which corresponds to a keyword candidate indicating as being not selectable is listed just above the field being displayed inside the focusing frame 624, the keyword determining section 231 scrolls the keyword list 621 in such a way that a field which is listed above and nearest to the certain item field 627, and is either of an item field 627 which corresponds to a keyword candidate indicating as being selectable and an input field 626, is moved into the focusing frame 624. In this way, the item field 627 which corresponds to a keyword candidate indicating as being not selectable cannot be selected. That is, the item field 627 which corresponds to a keyword candidate indicating as being not selectable becomes a field not selectable, and the fields other than that item field 627 become field selectable.

As illustrated in FIG. 6, an upward arrow mark 628 and a downward arrow mark 629, which indicate in which direction the movement can be made are displayed above and below the focusing frame 624.

Moreover, the keyword determining section 231 causes the item field 627 or the input field 626 inside the focusing frame 624 to be displayed larger than the other fields out of the focusing frame 624. Moreover, the keyword determining section 231 may be configured to cause the focusing frame 624 to be blinked when displayed. By these configurations, a user can easily recognize the field being highlighted.

Moreover, the keyword determining section 231 is configured such that its default setting in displaying the keyword list 621 is to display an input field 626 inside the focusing frame 624. That is, when the smart search panel is selected on the menu screen 100 in order to display the screen illustrated in FIG. 6, a screen on which an input field (keyword input field) 626 having a search keyword input text box 625 is selected is displayed firstly. Search process performed by a user is highly possibly one searching with a keyword inputted via the input field 626. That is, because the user selects the smart search panel with an intension to search something while watching a program content or the like, it is natural that a first item to be selected is keyword input. Therefore, a user can perform the input of keyword immediately if the screen on which the input field 626 is selected is set to be default. Meanwhile, when, after shifting to the smart search screen 600, the user finds among the keyword candidates a text for searching (searching text) more appropriate than one composed by the user himself/herself, and the user wants to perform the search process with that searching text included in the keyword candidates, the user can perform the search process with that searching text easily because that searching text can be selected simply by moving a cursor upward or downward.

When the TV 1 is in a default state, no registered keyword nor previously-searched keyword has been registered. Moreover, when it is not possible to receive broadcast, it is not possible to receive program content information. In any of these cases, all of the first to fourth keyword candidates are indicated as being not selectable, that is, only the input field 626 is a field being selectable, while all of the item fields 627 are fields being not selectable and accompanied with a message "a searching word will be displayed", as illustrated in FIG. 8.

(Step (S) 5)

Next, if the currently watching image is a broadcast program content or a recorded program content, the keyword determining section 231 judges whether switching-over of the program content has been carried out or not (S5). The keyword determining section 231 may be configured such that the keyword determining section 231 identifies an ending time of the program content based on the program content information and performs the judgment of S5 based on the ending time thus identified. If the program content has been switched over (Yes at S5), the process goes back to S2. By this it is possible to perform real-time display of a first keyword candidate and a second keyword candidate, which are associated with the program content being displayed at the time.

(Step (S) 6 to 17)

If the program content has not been switched over (No at S5), the keyword determining section 231 judges whether or not the field inside the focusing frame 624 is an input field 626 (S6). If highlighted is an input field 626 (yes at S6), the keyword determining section 231 confirms whether the enter key of the RC 10 is pressed or not (S7), If the enter key is not pressed (No at S7), the process goes back to S5. If the enter key is pressed (Yes at S7), the keyword determining section 23 causes a software keyboard 80 to be displayed, as illustrated in FIG. 10, in order to allow keyword input.

Figure 10:
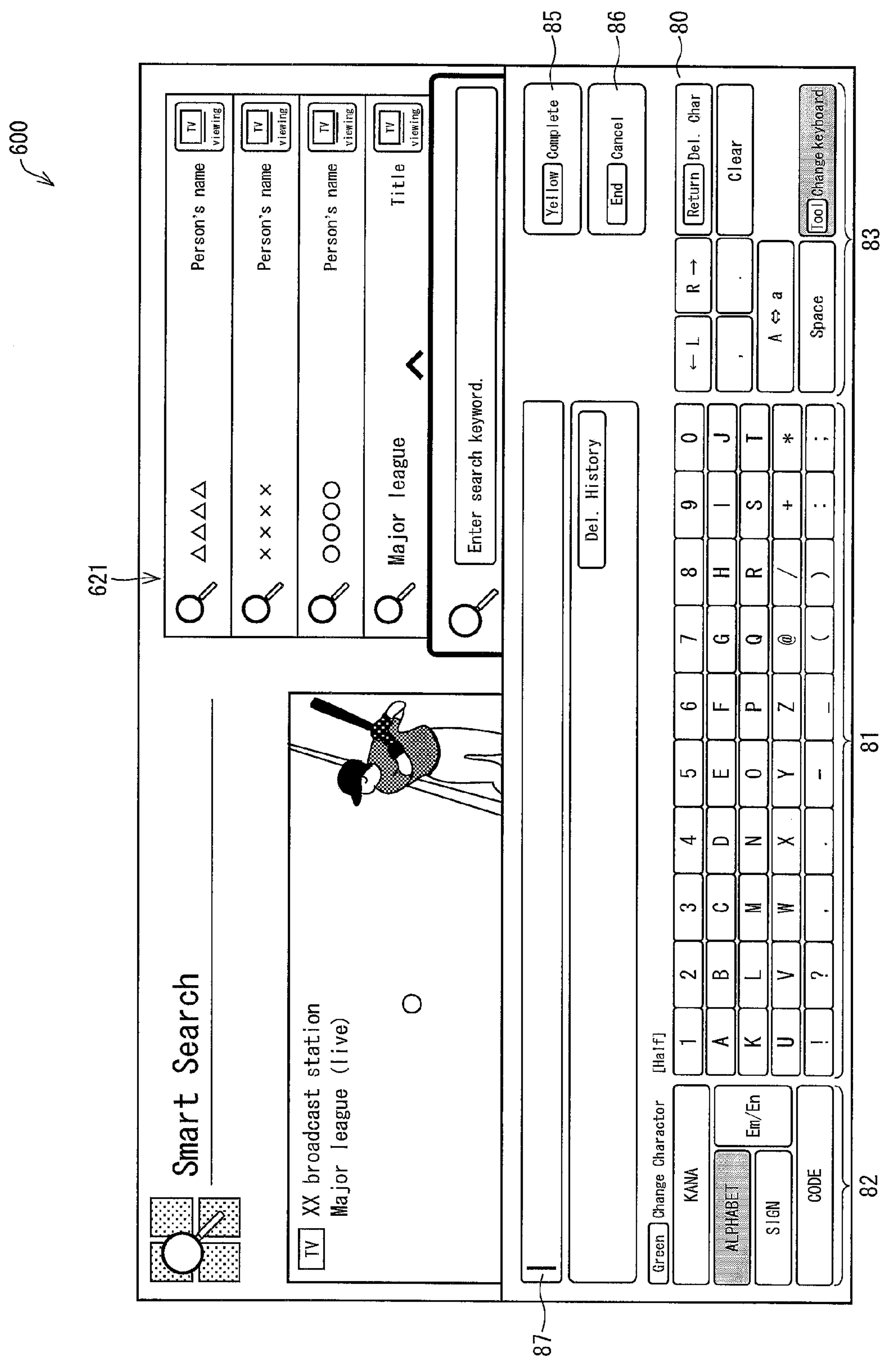
FIG. 10 is a view illustrating one example of a smart search screen on which a software keyboard is displayed.

The software keyboard 80 includes, as illustrated in FIG. 10, various character keys 81, switching keys 82 for switching kinds of characters to input, cursor moving keys 83, an input terminating key 85, an input cancelling key 86, and an input character displaying field 87 for displaying a character(s) inputted. A user can input a keyword by selecting the keys on the software keyboard 80.

After that, the keyword determining section 231 judges whether an instruction to return the screen is inputted or not (S9). More specifically, when the end key of the RC 10 is pressed, or when the input terminating key 85 of the software keyboard 80 is pressed with no character inputted in the input character display field 87, or when the input cancelling key 86 of the software keyboard 80 is pressed, the keyword determining section 231 judges that an input to return the screen is inputted. If Yes at S9, the software keyboard 80 is deleted from the screen and the process goes back to S5.

If No at S9, the keyword determining section 231 judges whether or not the input terminating key 85 is pressed while one or more characters is inputted in the input character displaying field 87 (S10). If No at S10, the process goes back to S9. On the other hand, if Yes at S10, the keyword determining section 231 determines that the keyword inputted in the input character displaying field 87 is the searching keyword (S11). Then, the keyword determining section 231 causes the searching keyword to be displayed in the searching keyword input text box 625 in the input field 626, and outputs the searching keyword to the search result acquiring section 233.

Figure 11:
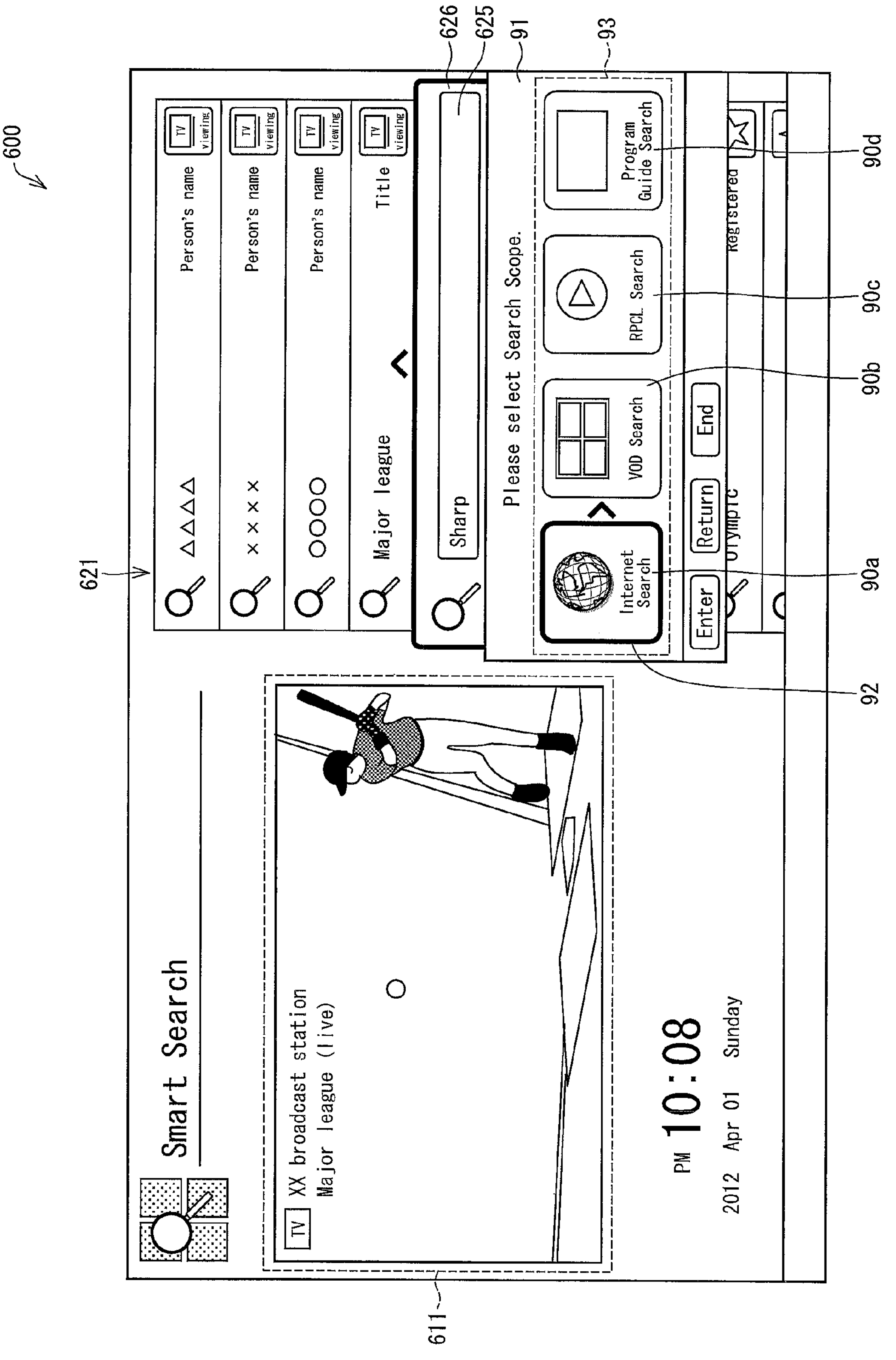
FIG. 11 is a view illustrating one example of a smart search screen on which a search scope list is displayed.

Next, the search field determining section 232 causes a search scope list 93 to be displayed, as illustrated in FIG. 11 (S12). The search scope list 93 is a list of (1) a search scope selecting icon 90*a* for selecting Internet search, (2) a search scope selecting icon 90*b* for selecting VOD search, (3) a search scope selecting icon 90*c* for selecting recorded program content list search, and (4) a search scope selecting icon 90*d* for selecting program guide search. FIG. 11 is a view illustrating one example of a smart search screen 600 on which the icons for search scope selection are displayed. As illustrated in FIG. 11, the smart search screen 600 has an icon displaying region 91 for displaying the four search scope selecting icons 90*a* to 90*d*. The search scope determining section 232 is preferably configured to cause the icon displaying region to be displayed on the keyword list 621 without overlapping the currently watching image displaying region 611, as illustrated in FIG. 11. This allows a user to perform the search process while watching the currently watching image. In the following, the search scope selecting icons 90*a* to 90*d* may be referred to as search scope selecting icons 90 generically, when it is not necessary to refer to the search scope selecting icons 90*a* to 90*d* distinguishedly.

Moreover, the search scope determining section 232 causes the four search scope selecting icons 90*a* to 90*d* to be displayed in the icon displaying region 91 in such a way that the four search scope selecting icons 90*a* to 90*d* are aligned laterally. In the present embodiment, the search scope selecting icons 90*a*, 90*b*, 90*c*, and 90*d* are displayed to be aligned in this order from left to right. The search scope determining section 232 causes a focusing frame 92 to be displayed, the focusing frame 92 framing one of the four search scope selecting icons 90*a* to 90*d*. The focusing frame 92 is moved from one search scope selecting icon 90 to another search scope selecting icon 90 next to the one search scope selecting icon 90 rightward or leftward according to whether the rightward key or the leftward key of the RC 10 is pressed.

The search scope determining section 232 checks whether or not the LAN interface 211 is connected to the Internet. Moreover, the search scope determining section 232 checks whether or not the USB terminal 214 is connected with the HDD 20. FIG. 12 is a view illustrating a table for determining whether (1) the Internet search, (2) the VOD search, (3) the recorded program content list search, and (4) the program guide search are selectable or not, according to whether or not the LAN interface 211 is connected to the Internet, and whether or not the USB terminal 214 is connected with the HDD 20. The search scope determining section 232 stores in advance a table as illustrated in FIG. 12, and sets, according to the table, whether or not the search scope selecting icons 90*a* to 90*d* are selectable.

More specifically, when the LAN interface 211 is connected to the Internet, the search scope determining section 232 sets that the search scope selecting icons 90*a* and 90*b* respectively for (1) the Internet search and (2) the VOD search are selectable. When the LAN interface 211 is not connected to the Internet, the search scope determining section 232 sets that the search scope selecting icons 90*a* and 90*b* respectively for (1) the Internet search and (2) the VOD search are not selectable. Furthermore, when the USB terminal 214 is connected with the HDD 20, the search scope determining section 232 sets that the search scope selecting icon 90*c* for (3) the recorded program content list search is selectable. When the USB terminal 214 is not connected with the HDD 20, the search scope determining section 232 sets that the search scope selecting icon 90*c* for (3) the recorded program content list search is not selectable. The search scope selecting icon 90*d* for (4) the program guide search is selectable regardless of whether or not the LAN interface 211 is connected to the Internet, and whether or not the USB terminal 214 is connected with the HDD 20.

The search scope determining section 232 makes it possible to move the focusing frame 92 to a selectable search scope selecting icon 90. On the other hand, the search scope determining section 232 causes a unselectable search scope selecting icon 90 to be displayed in grey and makes it impossible to move the focusing frame 92 to the unselectable search scope selecting icon 90. The search scope determining section 232 is configured such that a default position of the focusing frame 92 is a position at which the focusing frame 92 frames a selectable search scope selecting icon 90 located leftmost.

Figure 13:
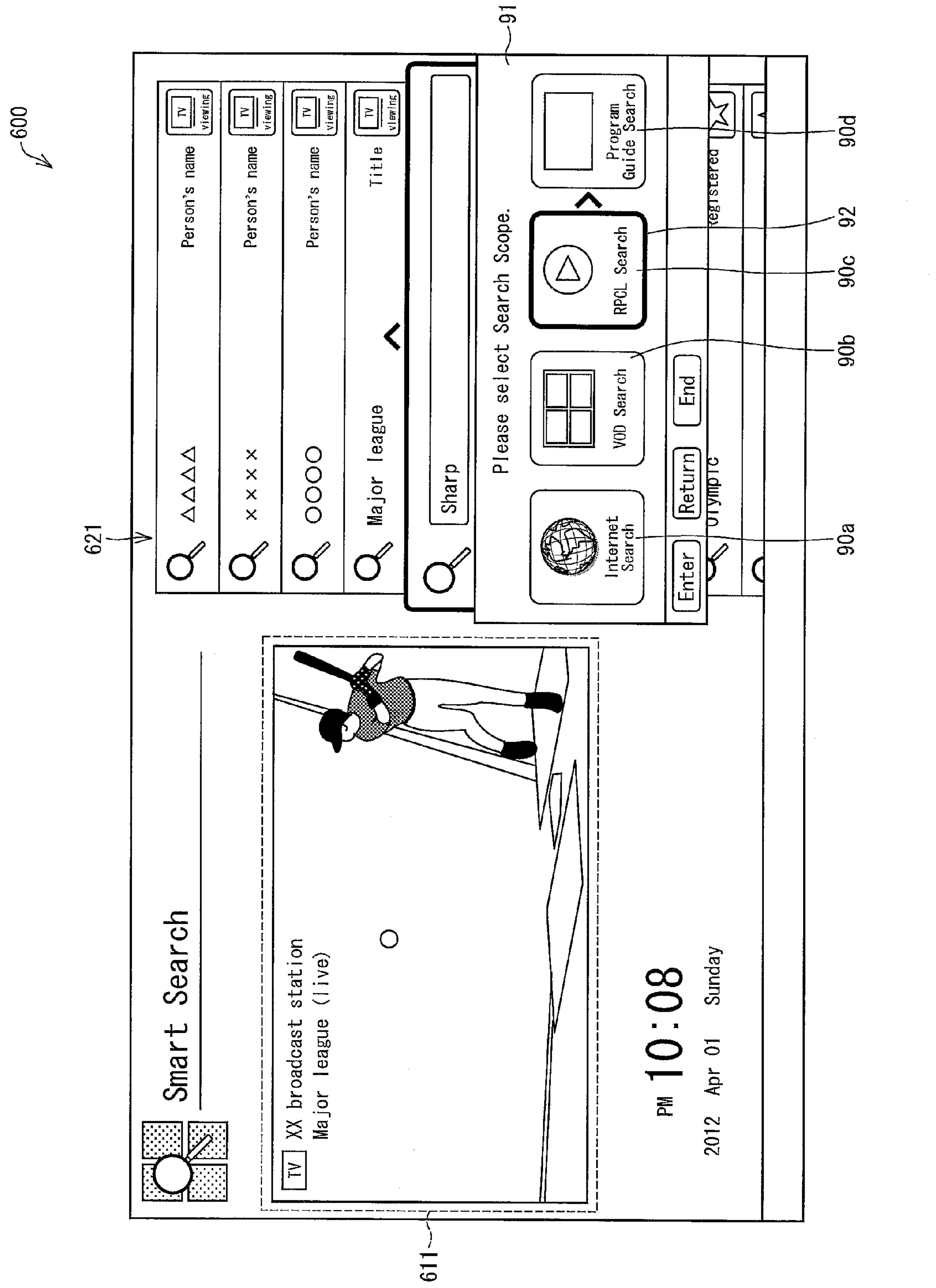
FIG. 13 is a view illustrating one example of a smart search screen on which a search scope list is displayed, and which is displayed when no Internet connection is established.

FIG. 13 is a view illustrating an example of a smart search screen 600 where the LAN interface 211 is not connected to the Internet so that the search scope selecting icons 90*a* and 90*b* are not selectable. The search scope selecting icons 90*a* and 90*b* are displayed in grey. Moreover, the focusing frame 92 is in the default setting so that the focusing frame 92 frames the search scope selecting icon 90*c*, which is located leftmost among the selectable search scope selecting icons 90*c* and 90*d*.

Next, the search scope determining section 232 checks whether the return key of the RC 10 is pressed or not (S13). If Yes at S13, the search scope selecting icons 90 are deleted from the screen and the process goes back to S5.

If No at S13, the search scope determining section 232 checks whether the enter key of the RC 10 is pressed or not (S14). If No at S14, the process goes back to S13. If Yes at S14, the search scope determining section 232 determines that it is instructed to perform search process with the search scope corresponding to a search scope selecting icon 90 being framed with the focusing frame 92 at the time, and outputs, to the search result acquiring section 233, search scope information indicating the search scope thus determined (S15).

After that, the search result acquiring section 233 activates application for performing search process with the search scope indicated by the search scope information, and causes the application to perform the search process with the search keyword determined by the keyword determining section 231. Then, the search result acquiring section 233 causes the display unit 205 to display a search result (S16). After that, the history information updating section 234 updates the history information storing section 235 with the search keyword as a previously-searched keyword (S17).

Figure 14:
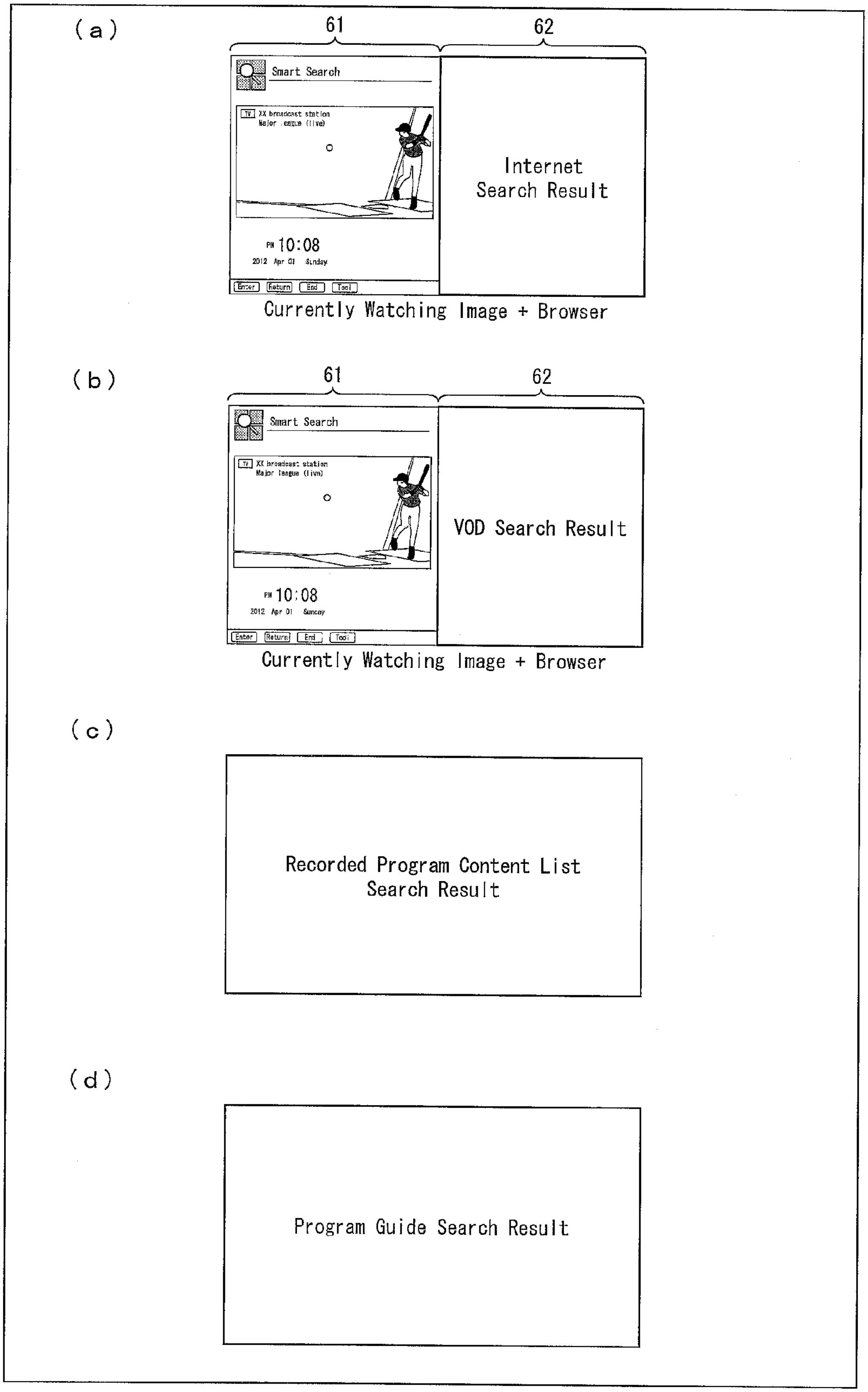
FIG. 14 is a view illustrating one example of display of search results. (a) illustrates display of search results of Internet search. (b) illustrates display of search results of VOD search. (c) illustrates display of search results of recorded program content list search (RPCL). (d) illustrates display of search results of a program guide search.

FIG. 14 is a view illustrating a display example of a search result. (a) of FIG. 14 illustrates a search result of the Internet search. (b) of FIG. 14 illustrates a search result of the VOD search. (c) of FIG. 14 illustrates a search result of the recorded program content list search. (d) of FIG. 14 illustrates a search result of the program guide search. As illustrated in FIG. 14, if the search scope is the Internet search or the VOD search, the search scope determining section 232 causes the search result to be displayed in the second region 62. If the search scope is the recorded program content list search or the program guide search, the search scope determining section 232 causes the search result to be displayed on the full screen of the display unit 205.

Figure 15:
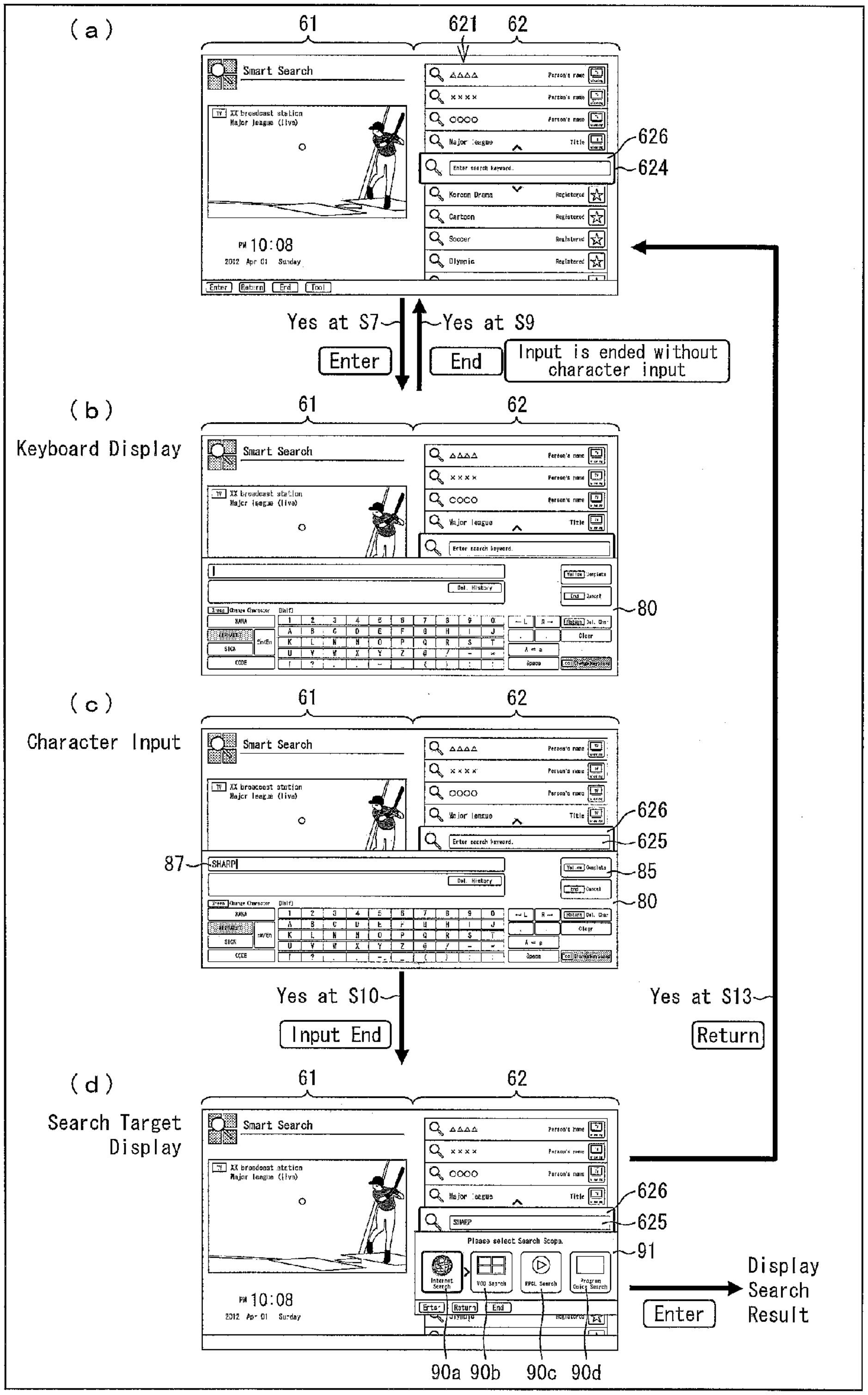
FIG. 15 is a view illustrating transition of a smart search screen during a process from S6 to S14 illustrated in FIG. 5.

FIG. 15 is a view illustrating transition of the smart search screen 600 in the process from S6 to S14. (a) of FIG. 15 illustrates a smart search screen 600 in which the keyword list 627 is displayed at S4. Here, when the enter key of the RC 10 is pressed at S7, the software keyboard 80 is displayed as illustrated in (b) of FIG. 15. At this point, no character has been inputted in the input character displaying field 87. After that, characters are inputted in the input character displaying field 87 via operation of the software keyboard 80, as illustrated in (c) of FIG. 15.

When the end key of the RC 10 is pressed in case of the screen illustrated in (b) or (c) of FIG. 15, or when the input terminating key 85 is pressed on the software keyboard 80 in case of the screen illustrated in (b) of FIG. 15 (that is, in case where even one character is not inputted in the input character displaying field 87), it is judged as Yes at S9, the screen returns to the screen illustrated in (a) of FIG. 15.

When the input terminating key 85 is pressed on the software keyboard 80 in case of the screen illustrated in (c) of FIG. 15, it is judged as Yes at S10, and the keyword inputted in the input character displaying field 87 of the software keyboard 80 is displayed in the search keyword input text box 625 of the input field 626. Further, the four search screen selecting icons 90*a* to 90*d* are displayed on the icon displaying region 91.

When the enter key of the RC 10 is pressed in case of the screen illustrated in (d) of FIG. 15, a search result as illustrated in FIG. 14 is displayed. When the return key of the RC 10 is pressed in case of the screen illustrated in (d) of FIG. 15, it is judged as Yes at S13, and the screen returns to the screen of (a) of FIG. 15.

(Steps (S) 18 to 21)

If No at S6, in other words, in case where an item field 627 indicating a keyword candidate is being highlighted, the keyword determining section 231 checks whether or not the enter key of the RC 10 is pressed (S18).

Figure 16:
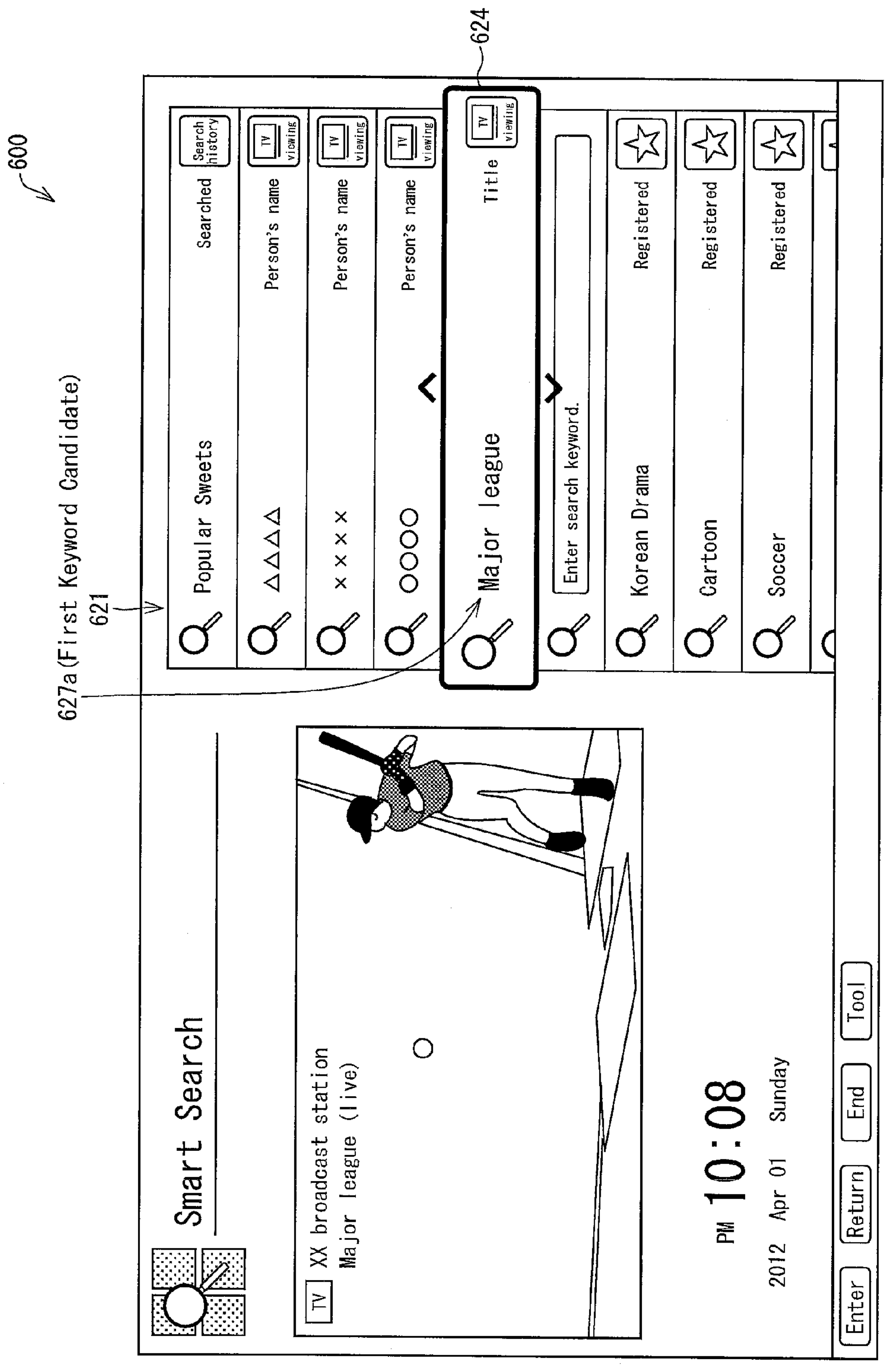
FIG. 16 is a view illustrating one example of a smart search screen in which an item field for a first keyword candidate (program name) is highlighted.
Figure 17:
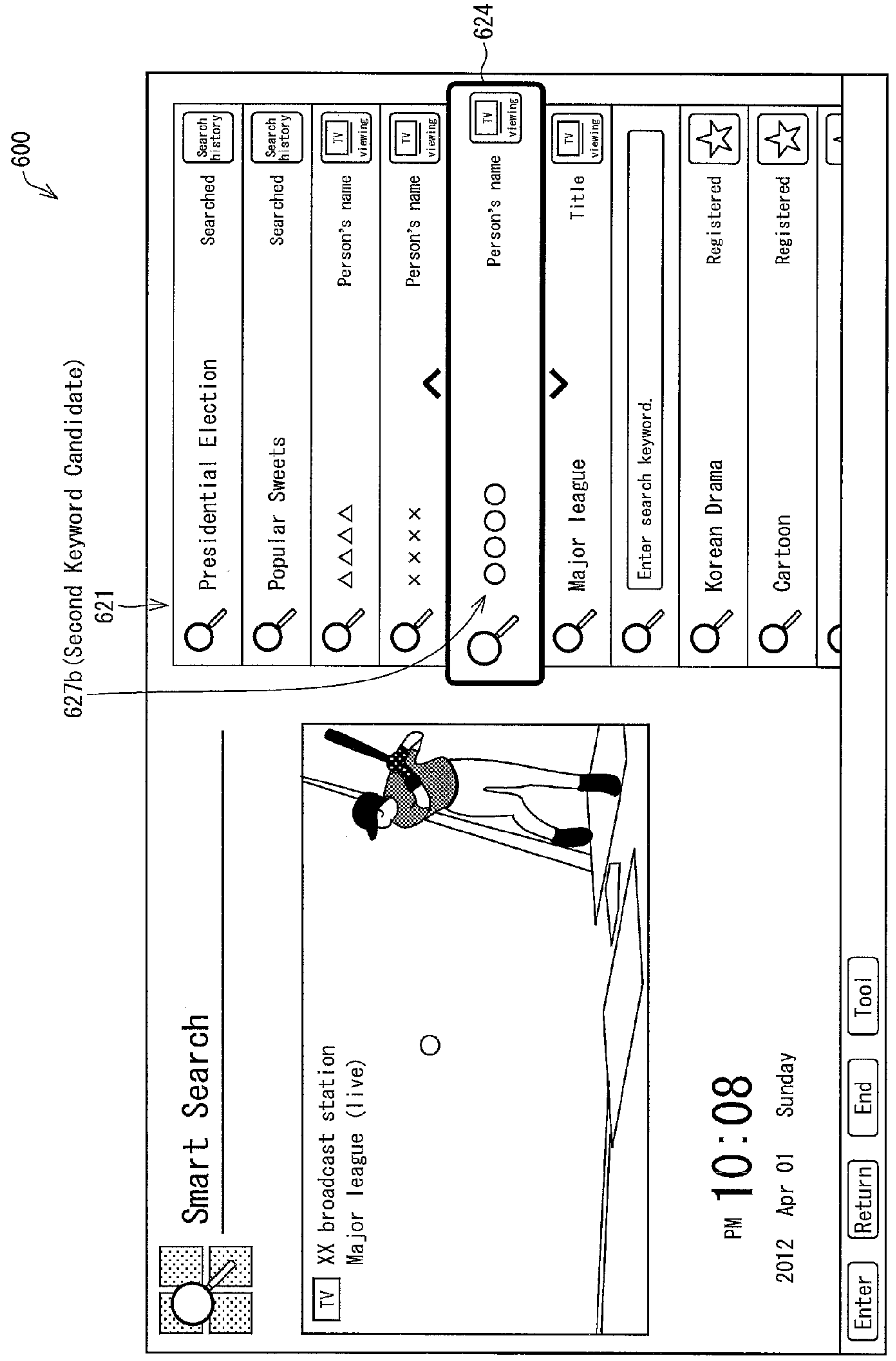
FIG. 17 is a view illustrating a view illustrating one example of a smart search screen in which an item field for a second keyword candidate (cast name) is highlighted.
Figure 18:
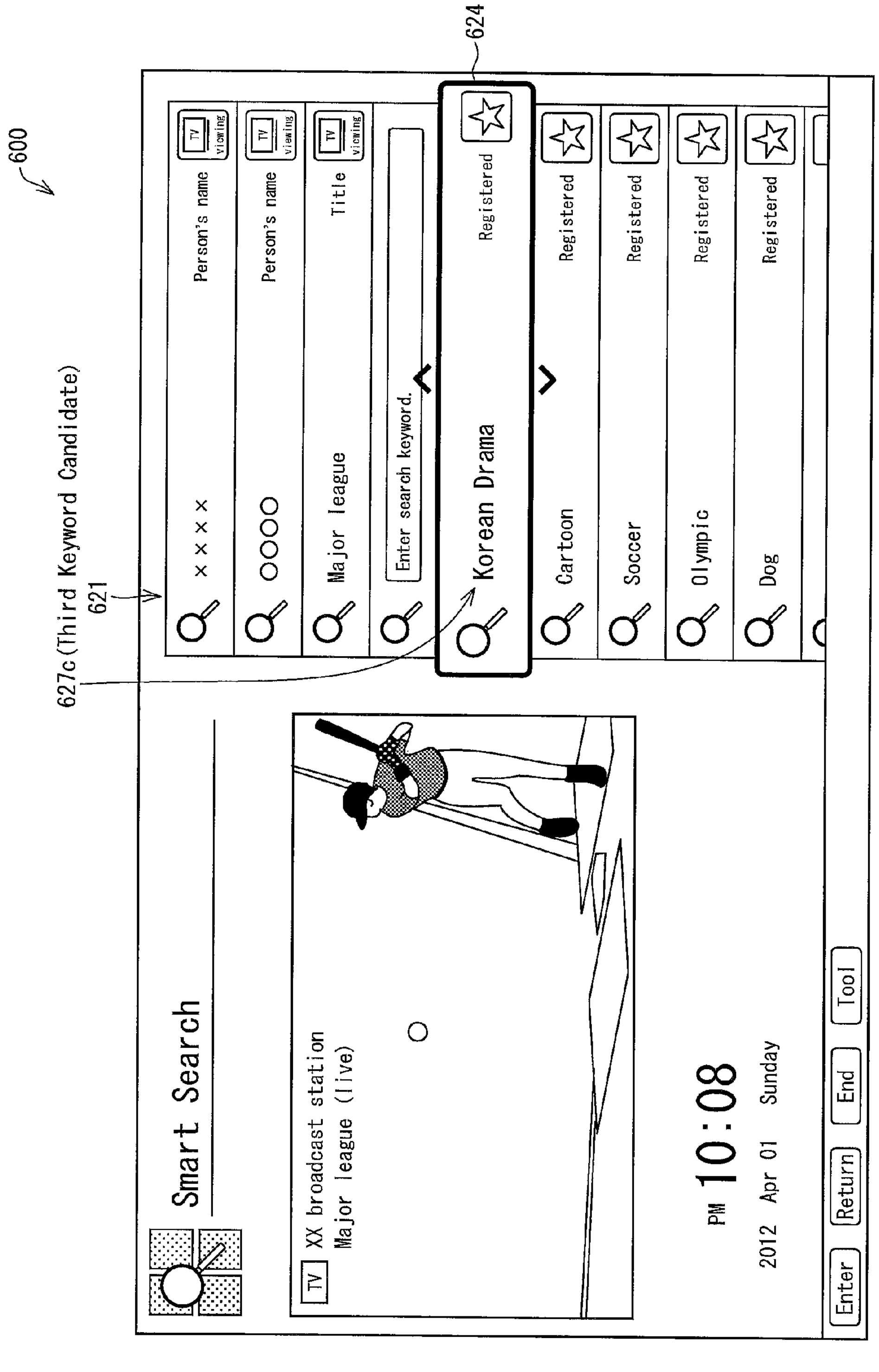
FIG. 18 is a view illustrating a view illustrating one example of a smart search screen in which an item field for a third keyword candidate (registered keyword) is highlighted.
Figure 19:
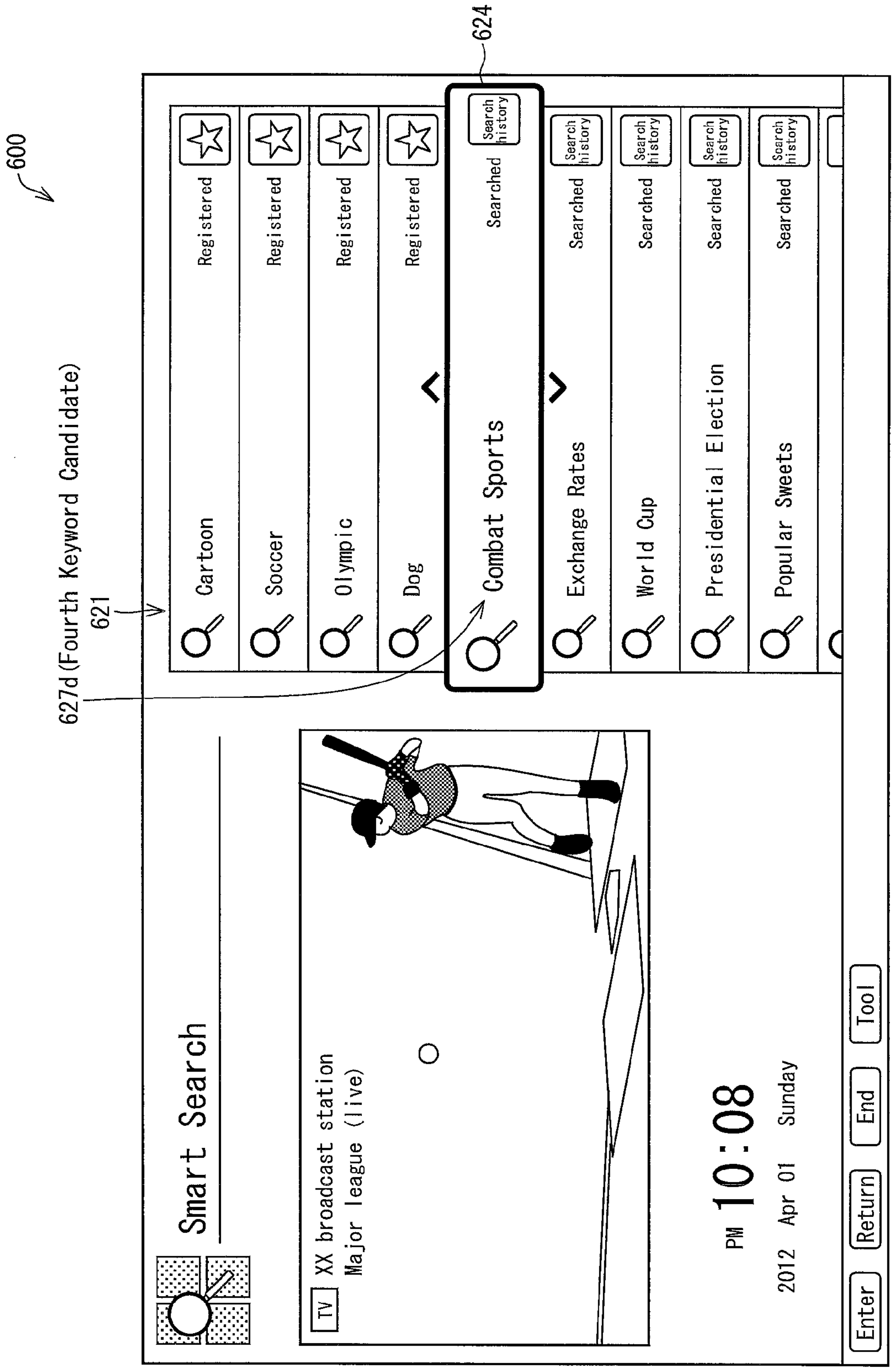
FIG. 19 is a view illustrating a view illustrating one example of a smart search screen in which an item field for a fourth keyword candidate (previously-searched keyword) is highlighted.

FIG. 16 illustrates a smart search screen 600 in which the item field 627*a* indicating the first keyword candidate (program content name) is being highlighted by the focusing frame 624. FIG. 17 illustrates a smart search screen 600 in which the item field 627*b* indicating the second keyword candidate (cast name) is being highlighted by the focusing frame 624. FIG. 18 illustrates smart search screen 600 in which the item field 627*c* indicating the third keyword candidate (registered keyword) is being highlighted by the focusing frame 624. FIG. 19 illustrates a smart search screen 600 in which the item field 627*d* indicating the fourth keyword candidate (previously-searched keyword) is being highlighted by the focusing frame 624.

When the enter key of the RC 10 is pressed, the keyword determining section 231 determines that the search keyword is the keyword indicated by an item field 627 framed by the focusing frame 624 (S19).

Then, the search scope determining section 232 checks whether or not the return key of the RC 10 is pressed (S20). If Yes at S20, the process goes back to S5.

On the other hand, if No at S20, the search scope determining section 232 checks whether or not the enter key of the RC 10 is pressed (S21). If No at S21, the process goes back to S20. If yes at S21, the process goes to S15, and the search scope determining section 232 determines that the search process will be performed with the search scope corresponding to the search scope selecting icon 90 framed by the focusing frame 92, as in the explanation of FIG. 13. After that S16 and S17 are performed and then the search process is ended.

<Effects>

As described above, a television 1 according to the present embodiment comprises: (A) a display unit (display section) 205; (B) first to fourth keyword candidate acquiring sections (keyword candidate acquiring means) 227 to 230 for acquiring a plurality of keyword candidates according to first to fourth algorithms different from each other; (C) a keyword determining section (keyword determining means) 231 for causing the display unit 205 to display thereon a keyword list 621 including the plurality of keyword candidates thus obtained, and for determining that a search keyword is to be a keyword candidate selected from the keyword list 621 by an input instruction; (D) a search scope determining section (search scope determining means) 232 for causing the display section to display a search scope list 93 of a plurality of search scopes different from each other, and for determining that a search scope to be used for search process with the search keyword is to be a search scope selected from the search scope list 93 by an input instruction; and (E) a search result acquiring section (search result displaying means) 233 for causing search process to be performed with the search keyword in the search scope thus determined, and for causing the display unit 205 to display a search result of the search process.

With this configuration, it becomes possible to select a keyword for search process from a keyword list including a plurality of keyword candidates, thereby eliminating the need of inputting a keyword. Moreover, the plurality of keyword candidates are obtained according to the first to fourth algorithms different from each other, whereby keyword candidates acquired in various points of views are displayed as a result. This makes it easy to select a keyword as desired, thereby facilitating a user in determining the search keyword.

Moreover the search process is performed with the search keyword in the search scope selected from a search scope list 93 including a plurality of search scopes different from each other. As a result, the search process is carried out limitedly within the desired search scope, thereby making it easier to find out desired information from the search result.

Further, the first and second keyword candidate acquiring sections 227 and 228 acquire, as the keyword candidates, keywords associated with the program content being displayed in the first region 61. This makes it possible for a user to easily select a keyword associated with the program content that the user is watching.

More specifically, the first keyword candidate acquiring section 227 acquires a first keyword candidate according to the first algorithm for acquiring a program content name of a program content as the first keyword candidate. The second keyword candidate acquiring section 228 acquires a second keyword candidate according to the second algorithm for acquiring a cast name in the program content as the second keyword candidate. The third keyword candidate acquiring section 229 acquires a third keyword candidate according to the third keyword candidate for acquiring as the third keyword candidate a registered keyword being registered in advance. The fourth keyword candidate acquiring section 230 acquires a fourth keyword candidate according to the fourth algorithm for acquiring as the fourth keyword candidate a previously-searched keyword having been used in search process previously. With this configuration, keyword candidates with high probabilities of being desirable keywords for search process are displayed, thereby increasing probability of saving trouble in the keyword selection of the user.

<Modifications>

(a) In the above explanation, the keyword determining section 231 performs S5 and, if the program content is switched over to another program content, causes the keyword list 621 to be displayed, the keyword list 621 including the item fields 627*a* and 627*b* of the first keyword candidate and the second keyword candidate extracted according to the another program content. However, S5 can be omitted, so that the keyword list 621 is not updated even if the program content is switched over to another program content. Some users may want to perform the search process with a keyword associated with the program content having been displayed at the time when the smart search panel is selected on the menu screen 100.

(b) In the above explanation, the keyword determining section 231 causes the keyword list 621 to include the item field 627 for a keyword candidate indicating as being not selectable. However, the keyword determining section 231 may cause the keyword list 621 to exclude therefrom the item field 627 for a keyword candidate indicating as being not selectable.

(c) In the above explanation, the search scope determining section 232 displays, in the icon displaying region 91, the search scope selecting icon 90*a* for the Internet search, the search scope selecting icon 90*b* for the VOD search, the search scope selecting icon 90*c* for the recorded program content list search, and the search scope selecting icon 90*d* for the program guide search, in this order from left to right. However, the order to display the search scope selecting icons 90 is not limited to this.

For example, the search scope determining section 232 may be configured to store how many times (frequencies) the respective Internet search, the VOD search, the recorded program content list search, and the program guide search have been determined as the search scope for search processes previously, and to align the search scope selecting icons 90 for the search scopes from the left to right in the descending order of the frequencies. In this case, the default position of the focusing frame 92 is to frame the leftmost one of the search scope selecting icons 90. Thereby, a user can easily select a search scope with a greater frequency of having been selected previously.

As an alternative, the search scope determining section 232 may be configured to change the order of aligning the search scope selecting icons 90 depending on the search keyword. For example, if the first keyword candidate (program content name of the currently watching image) or the second keyword candidate (cast names of the currently watching image) is determined as the search keyword, the search scope determining section 232 positions the search scope selecting icon 90*d* for the program guide search at the leftmost position. In case a program content name or a cast name of the currently watching image is to be determined as a search keyword, it is highly probable that the user wants to know about another program content. By positioning the search scope selecting icon 90*d* for the program guide search at the leftmost position, a user's labor necessary for selecting the program guide search is saved.

Figure 20:
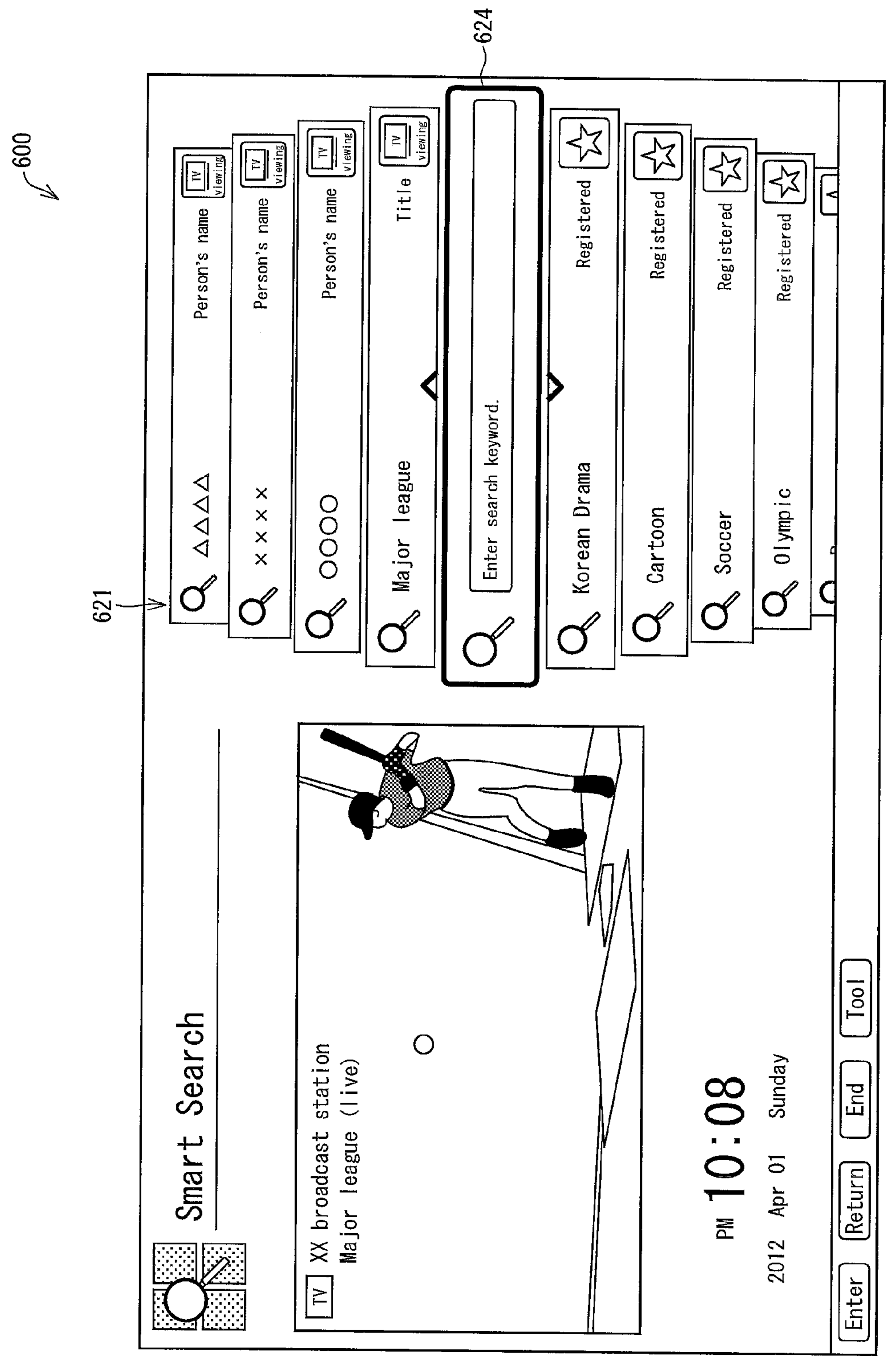
FIG. 20 is a view illustrating a view illustrating one example of a smart search screen in which an upward key or a downward key is pressed continuously in order to scroll the keyword list.

(d) In the above explanation, the keyword determining section 231 scrolls the keyword list 621 upward or downward by one field when the upward or downward key of the RC 10 is pressed. In this case, it would be troublesome to scroll the keyword list 621 so as to relatively move the focusing frame 624 from a lowest field to a highest field thereof. In view of this, the keyword determining section 231 may be configured such that, when the upward or downward button of the RC 10 is held down continuously for a predetermined period of time or longer (long pressing), the keyword determining section 231 scrolls the keyword list 621 faster than the scrolling in the aforementioned embodiment. The faster scrolling of the keyword list 621 may be carried out in such a way that, as illustrated in FIG. 20, the keyword list 621 is displayed as being attached around a virtual cylindrical body whose axis is along a horizontal direction of the screen and being sterically displayed as if the virtual cylindrical body rotates.

That is, the keyword list 621 is displayed in such a way that fields located at or near a middle of the keyword list 621 where the focusing frame 624 is located are displayed relatively larger, and fields located closer to an upper or lower edge of the screen are displayed smaller gradually depending on how close the fields are close to the upper of lower edge of the screen. By this, the fields located at or near the middle look as if they are located closer to the user while the fields located closer to the upper or lower edge of the screen are located farther from the user. When the keyword list 621 displayed as such is scrolled fast, the keyword list 621 look as if the keyword list 621 is a virtual cylindrical body rotating.

(e) In the above explanation, the history information updating section 234 stores the previously-searched keyword in the history information storing section 235 in such a way that the previously-searched keyword is associated with search frequency. However, the history information updating section 234 may be configured such that the history information updating section 234 stores the previously-searched keyword in the history information storing section 235 in such a way that the previously-searched keyword is associated with search time. In this case, the history information updating section 234 deletes a previously-searched keyword with an oldest search time, when the number of previously-searched keyword being stored in the history information storing section 235 exceeds the third predetermined number (for example, five (5)). In this way, the history information storing section 235 stores previously-searched keyword(s) with latest search time. This makes it easier for a user to select in the keyword list 621 a keyword (fourth keyword candidate) that is recently used.

(f) Finally, each block of the control section 220 may be realized by means of hardware by using logic circuits formed on an integrated circuit (IC chip), or by means of software by using a CPU (Central Processing Unit).

In the latter case, the control section 220 includes a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and/or a memory containing the programs and various data. The object of the present invention can also be achieved by supplying to the 3D TV1 a computer-readable storage medium containing control program code (executable program, intermediate code program, or source program) for the control section 220, which control program code is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM, or a logic circuit or the like such as PLD (Programmable Logic Device), or FPGA (Field Programmable Gate Array).

The control section 220 may be arranged to be connectable to a communications network so that the program code may be made available over the communications network. The communications network is not limited in any particular manner, as long as the program code can be transferred via the communication network and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner as long as the program code can be transfer via the medium, and may be, for example, wired line, such as IEEE 1394, USB, electric power line, cable TV line, telephone line, or ADSL line; or wireless, such as infrared radiation (IrDA, remote control), Bluetooth (Registered Trademark), 802.11 wireless, HDR (High Data Rate), NFC (Near Field Communication), DLNA (Digital Living Network Alliance), mobile telephone network, satellite line, or terrestrial digital network.

SUMMARY

As described above, a display device according to one aspect of the present invention is a display device comprising: a display section; keyword candidate acquiring means for acquiring a plurality of keyword candidates according to algorithms different from each other; keyword determining means for causing the display section to display thereon a keyword list including the plurality of keyword candidates thus obtained by the keyword candidate acquiring means, and for determining that a search keyword is to be a keyword candidate selected from the keyword list by an input instruction; search scope determining means for causing the display section to display a search scope list of a plurality of search scopes different from each other, and for determining that a search scope to be used for search process with the search keyword thus determined by the keyword determining means is to be a search scope selected from the search scope list by an input instruction; and search result displaying means for causing search process to be performed with the search keyword in the search scope determined by the search scope determining means, and for causing the display section to display a search result of the search process.

Moreover, a search method according to one aspect of the present invention is a search method for performing search process by means of a display device, the search method comprising: a keyword candidate acquiring step of acquiring a plurality of keyword candidates according to algorithms different from each other; a keyword determining step of causing the display device to display thereon a keyword list including the plurality of keyword candidates thus obtained by the keyword candidate acquiring step, and of determining that a search keyword is to be a keyword candidate selected from the keyword list by an input instruction; a search scope determining step of causing the display device to display a search scope list of a plurality of search scopes different from each other, and of determining that a search scope to be used for search process with the search keyword thus determined by the keyword determining step is to be a search scope selected from the search scope list by an input instruction; and a search result displaying step of causing search process to be performed with the search keyword in the search scope determined by the search scope determining step, and of causing the display device to display a search result of the search process.

The above arrangements make it possible that a keyword for search process can be selected from a keyword list including a plurality of keywords. This saves the labor of inputting a keyword. Different algorithms are used to obtain a plurality of keyword candidates. Thus, keyword candidates obtained in terms of various points of views are displayed, thereby making it easier to find a desired keyword. This allows a user to easily select a keyword for search process.

Moreover, the search process with the search keyword is performed in a search scope selected from a search scope list including search scopes different from each other. As a result, the search process is performed limitedly within the desired search scope, thereby making it easier to find desired information from a search result.

The above arrangements make it possible to realize a display device, which makes it easier for a user to determine a keyword for search process, and to find out desired information from a search result.

Furthermore, a display device according to one aspect of the present invention is preferably configured to further comprise: image display process means for causing the display section to display a program content received via broadcast waves or recorded in advance, the keyword determining section causing the display section to display the keyword list in a part of a screen of the display section and the image display process means causing the display section to display the program content in the rest of the screen of the display section.

This configuration allows a user to perform the selection process for a keyword while watching a program content.

Further, a display device according to one aspect of the present invention is preferably configured such that the keyword candidate acquiring means acquires, as the keyword candidates, keywords associated with the program content that is being displayed by the image display process means.

This configuration makes it possible to easily select a keyword associated with a program content that is being watched.

Furthermore, a display device according to one aspect of the present invention is preferably configured such that the keyword candidate acquiring means acquires the plurality of the keyword candidates according to first to fourth algorithms, (a) the first algorithm being for acquiring, as a keyword candidate, a program content name of the program content being displayed by the image display process means, (b) the second algorithm being for acquiring, as a keyword candidate, a cast name in the program content being displayed by the image display process means, (c) the third algorithm being for acquiring, as a keyword candidate, a registered keyword having being registered in advance, and (d) the fourth algorithm being for acquiring, as a keyword candidate, a previously-searched keyword, which is a keyword having been used in search process performed previously by the search result displaying means.

It is highly probable that a user wishes to perform search process with a program content name or a cast name of a program content, which the user is watching. Moreover, it is highly probable that a user wishes to perform search process with a registered keyword regardless of a program content, which the user is watching, the registered keyword being a keyword in a field interested by the user and having been registered in advance. Furthermore, it is highly probable that a user wishes to perform search process again with a previously-searched keyword with which the user has performed search processed before. With this configuration, a keyword list including keyword candidates obtained by the first to fourth algorithms for taking into consideration a plurality of points of views as exemplified by these examples. With this configuration, keyword candidates with high probabilities to be keywords with which a user wishes to perform search process are displayed, thereby increasing probability of saving labor in user's selecting a keyword.

Furthermore, a display device according to the present invention is preferably configured such that the search scope determining means causes the search scope list to be displayed in such a way that the search scope list overlaps the keyword list, but not the program content.

With this configuration, the user can proceed the selection of the search scope while watching a program content.

Furthermore, a display device according to the present invention is preferably configured such that the keyword determining means includes in the keyword list an input field for inputting a keyword, and determines, when the input field is selected by an input instruction, that the search keyword is to be the keyword inputted in the input field.

With this configuration, if a user cannot find a desired keyword among the keyword candidates, the user can input a keyword with which the user wishes to perform search process.

Moreover, the display device may be a television, for example.

The display device may be realized by using a computer. In this case, a program for causing a computer to realize the display device by causing the computer to operate as each of the means, and a computer-readable recording medium are also included in the scope of the present invention.

The present invention is not limited to the above-described embodiments, and may be modified in various ways within the scope of the Claims. That is, embodiments obtained by combining technical means modified as appropriate within the scope of the Claims are also encompassed in the technical scope of the present invention.

INDUSTRIAL APPLICABILITY

The present invention is applicable to display devices such as liquid crystal display devices, plasma display devices, etc.

REFERENCE SIGNS LIST

1: Television
10: Remote Controller
20: HDD
61: First Region
62: Second Region
90, 90*a* to 90*d*: Search Scope Selecting Icons
92: Focusing Frame
93: Search Scope List
100: Menu Screen
201: Tuner
202: Video Recorder
203: Video Process Section (Image Display Process Means)
204: Display Controller (Image Display Process Means)
205: Display Unit (Display Section)
211: LAN Interface
212: Infrared Receiving Section
214: USB Terminal
220: Control Section
221: Keyword Registering Section
222: Registered Keyword Storing Section
223: Recorded Program Content List Process Section
224: Program Guide Process Section
225: Search Process Section
226: Screen Switching Section
227: First Keyword Candidate Acquiring Section (Keyword Candidate Acquiring Means)
228: Second Keyword Candidate Acquiring Section (Keyword Candidate Acquiring Means)
229: Third Keyword Candidate Acquiring Section (Keyword Candidate Acquiring Means)
230: Fourth Keyword Candidate Acquiring Section (Keyword Candidate Acquiring Means)
231: Keyword Determining Section (Keyword Determining Means)
232: Search Scope Determining Section (Search Scope Determining Means)
233: Search Result Acquiring Section (Search Result Displaying Means)
234: History Information Updating Section
235: History Information Storing Section
611: Currently watching image Displaying Region
621: Keyword List
624: Focusing Frame
625: Search Keyword Input Text Box
626: Input Field
627, 627*a* to 627*b*: Item Fields

The invention claimed is:

1. A display device, comprising:

a keyword candidate presenting section for presenting a plurality of keyword candidates;

a keyword selecting section for selecting a keyword from among the plurality of keyword candidates thus presented;

a search system presenting section for presenting a plurality of search systems;

a search system selecting section for selecting a search system from among the plurality of search systems thus presented;

a search section for causing an application for performing search process by way of the search system thus selected by the search system selecting section and with the keyword thus selected by the keyword selecting section;

a displaying section for displaying a search result of the search process performed by the search section;

an image display process section for causing a program content to be displayed, the program content being received via broadcast waves or recorded in advance, the keyword selecting section causing the plurality of keyword candidates to be displayed in a part of a display screen and the image display process section causing the program content to be displayed in the rest of the display screen, wherein the search system presenting section causes the plurality of search systems to be displayed in such a way that the plurality of search systems do not overlap the program content.

2. A display device as set forth in claim 1, wherein the keyword candidate presenting section presents, as the keyword candidates, keywords associated with the program content that is being displayed by the image display process section.

3. A display device as set forth in claim 1, wherein the keyword candidate presenting section presents the plurality of the keyword candidates according to first to fourth algorithms, (a) the first algorithm being for acquiring, as a keyword candidate, a program content name of the program content being displayed by the image display process section, (b) the second algorithm being for acquiring, as a keyword candidate, a cast name in the program content being displayed by the image display process section, (c) the third algorithm being for acquiring, as a keyword candidate, a registered keyword having being registered in advance, and (d) the fourth algorithm being for acquiring, as a keyword candidate, a previously-searched keyword, which is a keyword having been used in search process performed previously by the search section.

4. A display device as set forth in claim 1, wherein the search scope presenting section causes the plurality of search systems to be displayed in such a way that the plurality of search systems overlaps the plurality of keyword candidates, but not the program content.

5. A display device as set forth in claim 1, wherein the keyword selecting section includes in the plurality of keyword candidates an input field for inputting a keyword, and determines, when the input field is selected by an input instruction, that the search keyword is to be the keyword inputted in the input field.

6. A display device as set forth in claim 1, wherein the keyword candidate presenting section presents the plurality of keyword candidates acquired according to algorithms different from each other.

7. A display device as set forth in claim 1, wherein the search system presenting section presents the plurality of the search system together with the keyword thus selected by the keyword selecting section.

8. A television comprising a displaying device as set forth in claim 1.

9. A search method comprising:

a keyword candidate presenting step of presenting a plurality of keyword candidates;

a keyword selecting step of selecting a keyword from among the plurality of keyword candidates thus presented;

a search system presenting step of presenting a plurality of search systems;

a search system selecting step of selecting a search system from among the plurality of search systems;

a search step of causing an application for performing search process by way of the search system thus selected by the search system selecting step and with the keyword thus selected by the keyword selecting step;

a displaying step of displaying a search result of the search process performed by the search step;

an image display process step for causing a program content to be displayed, the program content being received via broadcast waves or recorded in advance, the keyword selecting step causing the plurality of keyword candidates to be displayed in a part of a display screen and the image display process step causing the program content to be displayed in the rest of the display screen, wherein the search system presenting step causes the plurality of search systems to be displayed in such a way that the plurality of search systems do not overlap the program content.

10. A non-transitory computer-readable recording medium in which a program is recorded, the program operating a display device as set forth in claim 1, and causing a computer to function as each of the sections.

* * * * *